United States Patent
Wen et al.

(10) Patent No.: US 10,554,485 B2
(45) Date of Patent: Feb. 4, 2020

(54) METHOD FOR CONFIGURING NETWORK, NETWORK SYSTEM, AND DEVICE

(71) Applicant: Huawei Technologies Co., Ltd., Shenzhen (CN)

(72) Inventors: Liufei Wen, Shenzhen (CN); Xiangyang Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 15/860,076

(22) Filed: Jan. 2, 2018

(65) Prior Publication Data

US 2018/0123880 A1    May 3, 2018

Related U.S. Application Data

(63) Continuation of application No. PCT/CN2015/083281, filed on Jul. 3, 2015.

(51) Int. Cl.
*G06F 15/177* (2006.01)
*H04L 12/24* (2006.01)
(Continued)

(52) U.S. Cl.
CPC ...... *H04L 41/0803* (2013.01); *G06F 9/45558* (2013.01); *G06F 13/4022* (2013.01);
(Continued)

(58) Field of Classification Search
CPC ............ H04L 41/0803; G06F 9/45558; G06F 13/4022; G06F 13/4282; G06F 2009/45595; G06F 2213/0026
See application file for complete search history.

(56) References Cited

U.S. PATENT DOCUMENTS

2006/0242710 A1   10/2006  Alexander
2010/0027420 A1    2/2010  Smith
(Continued)

FOREIGN PATENT DOCUMENTS

CN    102112981 A    6/2011
CN    102299843 A   12/2011
(Continued)

OTHER PUBLICATIONS

Philippe Legros; "Why using Single Root I/O Virtualization (SR-IOV) can help improve I/O performance and Reduce Costs"; Sep. 29, 2014; PLDA, 10 pages. (Year: 2014).*
(Continued)

*Primary Examiner* — Richard G Keehn
(74) *Attorney, Agent, or Firm* — Conley Rose, P.C.

(57) ABSTRACT

A network virtualization configuration method, a network system, and a device, where the method includes creating a switch virtual machine (VM), where the switch VM is configured to run a virtual switch, responding to a Peripheral Component Interconnect (PCI) scanning of the switch VM, configuring, using a physical function (PF) driver, a PCI Express (PCIE) device to allocate a corresponding network resource to the switch VM, and initializing the PCIE device using the PF driver, where a default forwarding rule of the initialized PCIE device includes setting a default forwarding port of the PCIE device to a VF receiving queue (VF 0) corresponding to the switch VM. Hence, a cross-platform virtual switch solution can be implemented, thereby improving flexibility of deploying a virtual switch, and implementing compatibility with different hypervisors/VM monitors (VMMs).

20 Claims, 8 Drawing Sheets

(51) Int. Cl.
  *G06F 9/455* (2018.01)
  *G06F 13/40* (2006.01)
  *G06F 13/42* (2006.01)
(52) U.S. Cl.
  CPC ............ *G06F 13/4282* (2013.01); *G06F 2009/45595* (2013.01); *G06F 2213/0026* (2013.01)

(56) References Cited

U.S. PATENT DOCUMENTS

| | | | |
|---|---|---|---|
| 2012/0005521 | A1 | 1/2012 | Droux et al. |
| 2012/0096459 | A1* | 4/2012 | Miyazaki ............ G06F 9/45558 718/1 |
| 2012/0102491 | A1* | 4/2012 | Maharana ........... G06F 9/45558 718/1 |
| 2013/0346531 | A1 | 12/2013 | Hummel et al. |
| 2014/0059160 | A1* | 2/2014 | Chernoff ................. H04L 49/70 709/217 |
| 2014/0229769 | A1 | 8/2014 | Abraham et al. |
| 2015/0009831 | A1 | 1/2015 | Graf |
| 2015/0026681 | A1 | 1/2015 | Lin et al. |
| 2015/0052282 | A1* | 2/2015 | Dong ...................... G06F 13/32 710/308 |
| 2015/0363219 | A1* | 12/2015 | Kasturi ............... H04L 41/5058 718/1 |

FOREIGN PATENT DOCUMENTS

| | | | |
|---|---|---|---|
| CN | 103607430 | A | 2/2014 |
| CN | 103609077 | A | 2/2014 |
| CN | 103873374 | A | 6/2014 |
| CN | 103986662 | A | 8/2014 |

OTHER PUBLICATIONS

Intel; "PCI-SIG SR-IOV Primer"; Jan. 2011; Intel; Rev. 2.5; 28 pages. (Year: 2011).*

Machine Translation and Abstract of Chinese Publication No. CN103609077, Feb. 26, 2014, 29 pages.
Foreign Communication From a Counterpart Application, Chinese Application No. 201580001268.X, Chinese Search Report dated Feb. 20, 2019, 2 pages.
Foreign Communication From a Counterpart Application, Chinese Application No. 201580001268.X, Chinese Office Action dated Mar. 4, 2019, 3 pages.
Machine Translation and Abstract of Chinese Publication No. CN102299843, Dec. 28, 2011, 23 pages.
Machine Translation and Abstract of Chinese Publication No. CN103607430, Feb. 26, 2014, 22 pages.
Machine Translation and Abstract of Chinese Publication No. CN103873374, Jun. 18, 2014, 38 pages.
Machine Translation and Abstract of Chinese Publication No. CN103986662, Aug. 13, 2014, 14 pages.
"OpenFlow Switch Specification," Version 1.5.1, Mar. 26, 2015, ONF TS-025, 283 pages.
Lee, K., et al. "Poster: Characterizing the Impact of Memory-Access Techniques on AMD Fusion," Proceeding SC'11 Companion Proceedings of the 2011 companion on High Performance Computing Networking, Storage and Analysis Companion. Nov. 12-18, 2011, pp. 75-76.
Tanyingyong, V., et al. "Using Hardware Classification to Improve PC-Based OpenFlow Switching," 2011 IEEE 12th International Conference on High Performance Switching and Routing (HPSR), Jul. 4-6, 2011, pp. 215-221.
Jin, X., et al. "Virtual Switching Without a Hypervisor for a More Secure Cloud." 2012, 6 pages.
Foreign Communication From a Counterpart Application, PCT Application No. PCT/CN2015/083281, English Translation of International Search Report dated Mar. 31, 2016, 2 pages.
Foreign Communication From a Counterpart Application, PCT Application No. PCT/CN2015/083281, English Translation of Written Opinion dated Mar. 31, 2016, 5 pages.
Foreign Communication From a Counterpart Application, European Application No. 15897402.2, Extended European Search Report dated May 17, 2018, 7 pages.

* cited by examiner

METHOD FOR CONFIGURING NETWORK, NETWORK SYSTEM, AND DEVICE

CROSS-REFERENCE TO RELATED APPLICATION

This application is a continuation of International Patent Application No. PCT/CN2015/083281 filed on Jul. 3, 2015, which is hereby incorporated by reference in its entirety.

TECHNICAL FIELD

Embodiments of the present disclosure relate to information technology field, and in particular, to a method for configuring a network, a network system, and a device.

BACKGROUND

With development of cloud computing and data centers, more services are migrated to data centers, and are executed on virtual machines (VMs). To satisfy network requirements of different services, a virtual switch that can be dynamically configured is introduced into a server. Although the virtual switch has high flexibility, its scalability and processing performance encounter a bottleneck due to a limited software processing capability.

A virtual switch usually runs in a kernel mode of a hypervisor or a VM monitor (VMM), directly receives a network data packet from a network interface card, and then forwards the network data packet to each VM based on a user-defined matching rule. Such a manner leads to a problem of high dependence of software of the virtual switch on the hypervisor/VMM. If commercial hypervisor/VMM software does not open a corresponding kernel interface to a software platform of a third-party virtual switch, the third-party virtual switch cannot run on the commercial hypervisor/VMM.

SUMMARY

Embodiments of the present disclosure provide a method for configuring a network, a network system, and a device such that a cross-platform virtual switch solution can be implemented, thereby improving flexibility of deploying a virtual switch, and implementing compatibility with different hypervisors/VMMs.

According to a first aspect, an embodiment of the present disclosure provides a method for configuring a network, where the network includes a VM manager, multiple computing VMs, and a Peripheral Component Interconnect Express (PCIE) device, the VM manager is connected to the PCIE device, the VM manager is configured to manage the multiple computing VMs, the PCIE device is a hardware device supporting a Single-Root Input/Output Virtualization (SR-IOV) standard, the PCIE device includes at least one physical function (PF) and at least one virtual function (VF), a PF driver managing the PCIE device runs on the VM manager, a VF is configured in each computing VM, a VF driver configured to manage the VF runs on the computing VM, and the method includes receiving a switch VM creation request, and creating a switch VM according to the switch VM creation request, where the switch VM is configured to run a virtual switch, and the virtual switch is configured to implement network switching between the multiple computing VMs, responding to Peripheral Component Interconnect (PCI) scanning of the switch VM, and configuring, using the PF driver, the PCIE device to allocate a corresponding network resource to the switch VM, and initializing the PCIE device using the PF driver, where a default forwarding rule of the initialized PCIE device includes setting a default forwarding port of the PCIE device to a VF receiving queue (VF 0) corresponding to the switch VM.

With reference to the first aspect, in a first possible implementation, before receiving a switch VM creation request, the method further includes configuring, using the PF driver, the PCIE device to reserve the VF 0, a corresponding PCIE address, and a corresponding communication memory resource for the switch VM.

With reference to the first possible implementation of the first aspect, in a second possible implementation, configuring, using the PF driver, the PCIE device to allocate a corresponding network resource to the switch VM includes configuring, using the PF driver, the PCIE device to allocate the reserved VF 0, corresponding PCIE address, and corresponding communication memory resource to the switch VM.

With reference to the first aspect, the first possible implementation of the first aspect, or the second possible implementation of the first aspect, in a third possible implementation, initializing the PCIE device using the PF driver includes initializing a flow table of the PCIE device using the PF driver, where the flow table is used to instruct the PCIE device to perform flow table rule matching and processing on a received data packet, and forward the received data packet to the VF 0 corresponding to the switch VM when no match is found.

With reference to the third possible implementation of the first aspect, in a fourth possible implementation, after initializing a matching flow table of the PCIE device using the PF driver, the method further includes obtaining flow table update information, where the flow table update information is used to update the flow table of the PCIE device, and writing the flow table update information into the PCIE device using the PF driver.

With reference to the fourth possible implementation of the first aspect, in a fifth possible implementation, if the PF driver communicates with each VF driver using a doorbell and mailbox mechanism, obtaining flow table update information includes receiving, using the PF driver, doorbell interrupt information sent by the PCIE device, reading, according to the doorbell interrupt information sent by the PCIE device, mailbox information in a mailbox corresponding to the doorbell interrupt information, determining whether the mailbox corresponding to the doorbell interrupt information belongs to a VF corresponding to the switch VM when the mailbox information is information about configuring the flow table of the PCIE device, and saving the mailbox information as the flow table update information if the mailbox corresponding to the doorbell interrupt information belongs to the VF corresponding to the switch VM.

According to a second aspect, an embodiment of the present disclosure provides a method for configuring a network, where the network includes a VM manager, multiple computing VMs, and a PCIE device, the VM manager is connected to the PCIE device, the VM manager is configured to manage the multiple computing VMs, the PCIE device is a hardware device supporting an SR-IOV standard, the PCIE device includes at least one PF and at least one VF, a PF driver managing the PCIE device runs on the VM manager, a VF is configured in each computing VM, a VF driver configured to manage the VF runs on the computing VM, and the method includes receiving, by the PCIE device, configuration information of the PF driver, and allocating a corresponding network resource to a switch VM created by the VM manager, where the switch VM is configured to run a virtual switch, and the virtual switch is configured to implement network switching between the multiple computing VMs, and receiving an initialization operation of the PF driver, where a default forwarding rule of the initialized PCIE device includes setting a default forwarding port of the PCIE device to a VF 0 corresponding to the switch VM.

With reference to the second aspect, in a first possible implementation, before receiving, by the PCIE device, configuration information of the PF driver, the method further includes receiving, by the PCIE device, initialization configuration operation information of the VM manager, and reserving the VF 0, a corresponding PCIE address, and a corresponding communication memory resource for the switch VM according to the initialization configuration operation information.

With reference to the first possible implementation of the second aspect, in a second possible implementation, allocating a corresponding network resource to a switch VM created by the VM manager includes allocating the reserved VF 0, corresponding PCIE address, and corresponding communication memory resource to the switch VM.

With reference to the second aspect, the first possible implementation of the second aspect, or the second possible implementation of the second aspect, in a third possible implementation, receiving an initialization operation of the PF driver includes receiving a flow table sent by the PF driver, where the flow table is used to instruct the PCIE device to perform flow table rule matching and processing on a received data packet, and forward the received data packet to the VF 0 corresponding to the switch VM when no match is found.

With reference to the third possible implementation of the second aspect, in a fourth possible implementation, after receiving a flow table sent by the PF driver, the method further includes receiving a network data packet, performing flow table rule matching on the received network data packet according to the flow table, and forwarding, if no match is found, the received network data packet to the VF 0 corresponding to the switch VM.

With reference to the fourth possible implementation of the second aspect, in a fifth possible implementation, after forwarding the received network data packet to the VF 0 corresponding to the switch VM, if the switch VM successfully finds a match in a local flow table, the method further includes receiving flow table update information sent by the switch VM, where the flow table update information is used to update a flow table of the PCIE device, instructing the VM manager to process the flow table update information, receiving the flow table update information written by the PF driver, and updating the flow table of the PCIE device according to the flow table update information.

With reference to the fifth possible implementation of the second aspect, in a sixth possible implementation, if the PF driver communicates with each VF driver using a doorbell and mailbox mechanism, receiving flow table update information sent by the switch VM includes receiving the flow table update information using a mailbox corresponding to the switch VM, and instructing the VM manager to process the flow table update information includes forwarding first doorbell interrupt information to the VM manager, where the first doorbell interrupt information is triggered by the virtual switch to instruct the PCIE device to process the flow table update information.

With reference to the sixth possible implementation of the second aspect, in a seventh possible implementation, after updating the flow table of the PCIE device according to the flow table update information, the method further includes sending second doorbell interrupt information to the switch VM, where the second doorbell interrupt information is used to notify the switch VM that the flow table update information has been successfully written into the flow table of the PCIE device.

According to a third aspect, an embodiment of the present disclosure provides a network system, where the network system includes a VM manager, multiple computing VMs, and a PCIE device, the VM manager is connected to the PCIE device, the VM manager is configured to manage the multiple computing VMs, the PCIE device is a hardware device supporting an SR-IOV standard, the PCIE device includes at least one PF and at least one VF, a PF driver managing the PCIE device runs on the VM manager, a VF is configured in each computing VM, and a VF driver configured to manage the VF runs on the computing VM, where the VM manager is configured to receive a switch VM creation request, create a switch VM according to the switch VM creation request, respond to PCI scanning of the switch VM, and configure, using the PF driver, the PCIE device to allocate a corresponding network resource to the switch VM, where the switch VM is configured to run a virtual switch, and the virtual switch is configured to implement network switching between the multiple computing VMs the PCIE device is configured to receive configuration information of the PF driver, and allocate a corresponding network resource to the switch VM running the virtual switch, and the VM manager is further configured to initialize the PCIE device using the PF driver, where a default forwarding rule of the initialized PCIE device includes setting a default forwarding port of the PCIE device to a VF 0 corresponding to the switch VM.

With reference to the third aspect, in a first possible implementation, the PCIE device is further configured to receive a data packet, and forward, according to the default forwarding rule, the data packet to the switch VM using the VF 0 corresponding to the switch VM, and the switch VM is configured to receive, using the VF 0 corresponding to the switch VM, the data packet forwarded by the PCIE device, and perform, according to a preset network forwarding rule, corresponding network forwarding process on the data packet forwarded by the PCIE device.

With reference to the third aspect or the first possible implementation of the third aspect, in a second possible implementation, the VM manager is further configured to configure the PCIE device using the PF driver, and the PCIE device is further configured to reserve the VF 0, a corresponding PCIE address, and a corresponding communication memory resource for the switch VM according to an initialization configuration operation information.

With reference to the second possible implementation of the third aspect, in a third possible implementation, the PCIE device is configured to receive the configuration information of the PF driver, and allocate the reserved VF 0, corresponding PCIE address, and corresponding communication memory resource to the switch VM.

With reference to any one of the third aspect, or the first to the third possible implementations of the third aspect, in a fourth possible implementation, the VM manager is configured to initialize a flow table of the PCIE device using the PF driver, where the flow table is used to instruct the PCIE device to perform flow table rule matching and processing on the received data packet, and forward the received data packet to the VF 0 corresponding to the switch VM when no match is found, and the PCIE device is configured to receive a flow table sent by the PF driver, and set a default forwarding port of the data packet received by the PCIE device to the VF 0 corresponding to the switch VM.

With reference to the fourth possible implementation of the third aspect, in a fifth possible implementation, the PCIE device is further configured to receive a network data packet, perform flow table rule matching on the received network data packet according to the flow table, and forward the received network data packet to the VF 0 corresponding to the switch VM if no match is found, and the switch VM is configured to receive, using the VF 0 corresponding to the switch VM, the network data packet forwarded by the PCIE device, and perform, according to a local flow table of the switch VM, flow table matching and processing on the network data packet forwarded by the PCIE device.

With reference to the fifth possible implementation of the third aspect, in a sixth possible implementation, if the switch VM successfully finds, according to the local flow table of the switch VM, a match for the network data packet forwarded by the PCIE device, the switch VM is further configured to buffer the network data packet forwarded by the PCIE device, and send flow table update information to the PCIE device, where the flow table update information is used to update the flow table of the PCIE device, the PCIE device is further configured to receive the flow table update information sent by the switch VM, and instruct the VM manager to process the flow table update information, the VM manager is further configured to obtain the flow table update information, and write the flow table update information into the PCIE device using the PF driver, and the PCIE device is further configured to receive the flow table update information written by the PF driver, and update the flow table of the PCIE device according to the flow table update information.

With reference to the sixth possible implementation of the third aspect, in a seventh possible implementation, if the PF driver communicates with each VF driver using a doorbell and mailbox mechanism, the switch VM is configured to send the flow table update information to a mailbox corresponding to the switch VM, and trigger first doorbell interrupt information, where the first doorbell interrupt information is used to instruct the PCIE device to process the flow table update information, the PCIE device is configured to receive the flow table update information using the mailbox corresponding to the switch VM, and send the first doorbell interrupt information to the VM manager, and the VM manager is configured to receive the first doorbell interrupt information forwarded by the PCIE device, read mailbox information in a mailbox corresponding to the first doorbell interrupt information, when the mailbox information is information about configuring the flow table of the PCIE device, determine whether the mailbox corresponding to the first doorbell interrupt information belongs to a VF corresponding to the switch VM, and if the mailbox corresponding to the first doorbell interrupt information belongs to the VF corresponding to the switch VM, store the mailbox information as the flow table update information.

With reference to the seventh possible implementation of the third aspect, in an eighth possible implementation, the PCIE device is further configured to send second doorbell interrupt information to the switch VM, where the second doorbell interrupt information is used to notify the switch VM that the flow table update information has been successfully written into the flow table of the PCIE device, and the switch VM is further configured to receive the second doorbell interrupt information sent by the PCIE device, and send, according to the local flow table of the switch VM, the buffered network data packet forwarded by the PCIE device.

According to a fourth aspect, an embodiment of the present disclosure provides a VM manager in a network, where the network includes the VM manager, multiple computing VMs, and a PCIE device, the VM manager is connected to the PCIE device, the VM manager is configured to manage the multiple computing VMs, the PCIE device is a hardware device supporting an SR-IOV standard, the PCIE device includes at least one PF and at least one VF, a PF driver managing the PCIE device runs on the VM manager, a VF is configured in each computing VM, a VF driver configured to manage the VF runs on the computing VM, and the VM manager includes a receiving unit configured to receive a switch VM creation request, and a processing unit configured to create a switch VM according to the switch VM creation request, where the switch VM is configured to run a virtual switch, and the virtual switch is configured to implement network switching between the multiple computing VMs, and respond to PCI scanning of the switch VM, and configure, using the PF driver, the PCIE device to allocate a corresponding network resource to the switch VM, where the processing unit is further configured to initialize the PCIE device using the PF driver, where a default forwarding rule of the initialized PCIE device includes setting a default forwarding port of the PCIE device to a VF 0 corresponding to the switch VM.

With reference to the fourth aspect, in a first possible implementation, the processing unit is further configured to configure, using the PF driver, the PCIE device to reserve the VF 0, a corresponding PCIE address, and a corresponding communication memory resource for the switch VM.

With reference to the first possible implementation of the fourth aspect, in a second possible implementation, the processing unit is configured to configure, using the PF driver, the PCIE device to allocate the reserved VF 0, corresponding PCIE address, and corresponding communication memory resource to the switch VM.

With reference to the fourth aspect, the first possible implementation of the fourth aspect, or the second possible implementation of the fourth aspect, in a third possible implementation, the processing unit is configured to initialize a flow table of the PCIE device using the PF driver, where the flow table is used to instruct the PCIE device to perform flow table rule matching and processing on a received data packet, and forward the received data packet to the VF 0 corresponding to the switch VM when no match is found.

With reference to the third possible implementation of the fourth aspect, in a fourth possible implementation, the receiving unit is further configured to obtain flow table update information, where the flow table update information is used to update the flow table of the PCIE device, and the processing unit is further configured to write the flow table update information obtained by the receiving unit into the PCIE device using the PF driver.

With reference to the fourth possible implementation of the fourth aspect, in a fifth possible implementation, if the PF driver communicates with each VF driver using a doorbell and mailbox mechanism, the receiving unit is configured to receive doorbell interrupt information sent by the PCIE device, and read, according to the doorbell interrupt information sent by the PCIE device, mailbox information in a mailbox corresponding to the doorbell interrupt information, when the mailbox information is information about configuring the flow table of the PCIE device, the processing unit is configured to determine whether the mailbox corresponding to the doorbell interrupt information belongs to a VF corresponding to the switch VM, and if the mailbox corresponding to the doorbell interrupt information belongs to the VF corresponding to the switch VM, the receiving unit is configured to store the mailbox information as the flow table update information.

According to a fifth aspect, an embodiment of the present disclosure provides a PCIE device in a network, where the network includes a VM manager, multiple computing VMs, and the PCIE device, the VM manager is connected to the PCIE device, the VM manager is configured to manage the multiple computing VMs, the PCIE device is a hardware device supporting an SR-IOV standard, the PCIE device includes at least one PF and at least one VF, a PF driver managing the PCIE device runs on the VM manager, a VF is configured in each computing VM, a VF driver configured to manage the VF runs on the computing VM, and the PCIE device includes a receiving unit configured to receive configuration information of the PF driver, and a processing unit configured to allocate, according to the configuration received by the receiving unit, a corresponding network resource to a switch VM running a virtual switch, where the switch VM is created by the VM manager, and the virtual switch is configured to implement network switching between the multiple computing VMs, where the receiving unit is further configured to receive an initialization operation of the PF driver, and the processing unit is further configured to set, according to the initialization operation received by the receiving unit, a default forwarding port of the PCIE device to a VF 0 corresponding to the switch VM.

With reference to the fifth aspect, in a first possible implementation, the receiving unit is further configured to receive initialization configuration operation information of the VM manager, and the processing unit is further configured to reserve the VF 0, a corresponding PCIE address, and a corresponding communication memory resource for the switch VM according to the initialization configuration operation information received by the receiving unit.

With reference to the first possible implementation of the fifth aspect, in a second possible implementation, the processing unit is configured to allocate the reserved VF 0, corresponding PCIE address, and corresponding communication memory resource to the switch VM.

With reference to the fifth aspect, the first possible implementation of the fifth aspect, or the second possible implementation of the fifth aspect, in a third possible implementation, the receiving unit is configured to receive a flow table sent by the PF driver, where the flow table is used to instruct the PCIE device to perform flow table rule matching and processing on a received data packet, and forward the received data packet to the VF 0 corresponding to the switch VM when no match is found, and the processing unit is configured to set a default forwarding port of the data packet received by the PCIE device to the VF 0 corresponding to the switch VM.

With reference to the third possible implementation of the fifth aspect, in a fourth possible implementation, the receiving unit is further configured to receive a network data packet, and the processing unit is further configured to perform, according to the flow table, flow table rule matching on the network data packet received by the receiving unit, and if no match is found, the processing unit is further configured to forward the network data packet received by the receiving unit to the VF 0 corresponding to the switch VM.

With reference to the fourth possible implementation of the fifth aspect, in a fifth possible implementation, the PCIE device further includes a notification unit, and the receiving unit is further configured to receive flow table update information sent by the switch VM, where the flow table update information is used to update a flow table of the PCIE device, the notification unit is configured to instruct the VM manager to process the flow table update information, the receiving unit is further configured to receive the flow table update information written by the PF driver, and the processing unit is further configured to update the flow table of the PCIE device according to the flow table update information received by the receiving unit.

With reference to the fifth possible implementation of the fifth aspect, in a sixth possible implementation, if the PF driver communicates with each VF driver using a doorbell and mailbox mechanism, the receiving unit is configured to receive the flow table update information using a mailbox corresponding to the switch VM, and the notification unit is configured to forward first doorbell interrupt information to the VM manager, where the first doorbell interrupt information is triggered by the virtual switch to instruct the PCIE device to process the flow table update information.

With reference to the sixth possible implementation of the fifth aspect, in a seventh possible implementation, the notification unit is further configured to send second doorbell interrupt information to the switch VM, where the second doorbell interrupt information is used to notify the switch VM that the flow table update information has been successfully written into the flow table of the PCIE device.

According to a sixth aspect, an embodiment of the present disclosure provides a network device, where the network device is connected to a PCIE device, the PCIE device is a hardware device supporting an SR-IOV standard, the PCIE device includes at least one PF and at least one VF, the network device includes a VM manager and multiple computing VMs, the VM manager is configured to manage the multiple computing VMs, a PF driver managing the PCIE device runs on the VM manager, a VF is configured in each computing VM, and a VF driver configured to manage the VF runs on the computing VM, where the VM manager is configured to receive a switch VM creation request, create a switch VM according to the switch VM creation request, respond to PCI scanning of the switch VM, and configure, using the PF driver, the PCIE device to allocate a corresponding network resource to the switch VM, where the switch VM is configured to run a virtual switch, and the virtual switch is configured to implement network switching between the multiple computing VMs, and the VM manager is further configured to initialize the PCIE device using the PF driver, where a default forwarding rule of the initialized PCIE device includes setting a default forwarding port of the PCIE device to a VF 0 corresponding to the switch VM.

With reference to the sixth aspect, in a first possible implementation, the switch VM is configured to receive, using the VF 0 corresponding to the switch VM, a data packet forwarded by the PCIE device, and perform, according to a preset network forwarding rule, corresponding network forwarding process on the data packet forwarded by the PCIE device.

With reference to the sixth aspect or the first possible implementation of the sixth aspect, in a second possible implementation, before receiving the switch VM creation request, and creating the switch VM according to the switch VM creation request, the VM manager is further configured to configure, using the PF driver, the PCIE device to reserve the VF 0, a corresponding PCIE address, and a corresponding communication memory resource for the switch VM.

With reference to the second possible implementation of the sixth aspect, in a third possible implementation, the VM manager is configured to initialize a flow table of the PCIE device using the PF driver, where the flow table is used to instruct the PCIE device to perform flow table rule matching and processing on a received data packet, and when no match is found, forward the received data packet to the VF 0 corresponding to the switch VM.

With reference to the third possible implementation of the sixth aspect, in a fourth possible implementation, the switch VM is configured to receive, using the VF 0 corresponding to the switch VM, a network data packet forwarded by the PCIE device, and perform, according to a local flow table of the switch VM, flow table matching and processing on the network data packet forwarded by the PCIE device.

With reference to the fourth possible implementation of the sixth aspect, in a fifth possible implementation, if the switch VM successfully finds, according to the local flow table of the switch VM, a match for the network data packet forwarded by the PCIE device, the switch VM is further configured to buffer the network data packet forwarded by the PCIE device, and send flow table update information to the PCIE device, where the flow table update information is used to update the flow table of the PCIE device, and the VM manager is further configured to obtain the flow table update information, and write the flow table update information into the PCIE device using the PF driver.

With reference to the fifth possible implementation of the sixth aspect, in a sixth possible implementation, if the PF driver communicates with each VF driver using a doorbell and mailbox mechanism, the switch VM is configured to send the flow table update information to a mailbox corresponding to the switch VM, and trigger first doorbell interrupt information, where the first doorbell interrupt information is used to instruct the PCIE device to process the flow table update information, and the VM manager is configured to receive the first doorbell interrupt information forwarded by the PCIE device, read mailbox information in a mailbox corresponding to the first doorbell interrupt information, when the mailbox information is information about configuring the flow table of the PCIE device, determine whether the mailbox corresponding to the first doorbell interrupt information belongs to a VF corresponding to the switch VM, and if the mailbox corresponding to the first doorbell interrupt information belongs to the VF corresponding to the switch VM, store the mailbox information as the flow table update information.

With reference to the sixth possible implementation of the sixth aspect, in a seventh possible implementation, the switch VM is further configured to receive second doorbell interrupt information sent by the PCIE device, and send, according to the local flow table of the switch VM, a buffered network data packet forwarded by the PCIE device, where the second doorbell interrupt information is used to notify the switch VM that the flow table update information has been successfully written into the flow table of the PCIE device.

According to a seventh aspect, an embodiment of the present disclosure provides a VM manager, including a processor and a memory, where the memory stores a computer-executable instruction, and the processor is connected to the memory using a communications bus, and when the VM manager runs, the processor executes the computer-executable instruction stored in the memory such that the apparatus performs the method according to the first aspect or any possible implementation of the first aspect.

According to an eighth aspect, an embodiment of the present disclosure provides a PCIE device, including a processor and a memory, where the memory stores a computer-executable instruction, and the processor is connected to the memory using a communications bus, and when the PCIE device runs, the processor executes the computer-executable instruction stored in the memory such that the apparatus performs the method according to the second aspect or any possible implementation of the second aspect.

According to a ninth aspect, an embodiment of the present disclosure provides a computer readable medium, including a computer-executable instruction, where when a central processing unit of a computer executes the computer-executable instruction, the computer performs the method according to the first aspect or any possible implementation of the first aspect or according to the second aspect or any possible implementation of the second aspect.

In the embodiments of the present disclosure, a dedicated switch VM used for network forwarding is created, and a PCIE device supporting SR-IOV, and a PF/VF driver are used such that a cross-platform virtual switch solution is implemented, thereby achieving compatibility with different hypervisors/VMMs, and improving flexibility of deploying a virtual switch.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure. To fully understand the present disclosure, the following describes in detail multiple details. However, a person skilled in the art should understand that the present disclosure can be implemented without the details. In some embodiments, well-known methods, processes, components, and circuits are not described in detail in order to prevent the embodiments from being blurred.

Technical solutions provided in the embodiments of the present disclosure may be applied to a network system. Using an example in which the network system is in a data center virtualization scenario, for a server, a hypervisor/VMM is installed and multiple VMs are created such that multiple users share the server. The server forwards network data packets of different users/VMs using a virtual switch, and is connected to an external controller to configure the virtual switch.

For convenience of understanding and implementation, the embodiments of the present disclosure first provide a network system 100. It should be noted that multiple modules or units are mentioned in this embodiment of the present disclosure. A person skilled in the art should know that functions of the multiple modules or units may be distributed to more sub-modules or subunits, or may be combined into fewer modules or units, to implement the same technical effects. Therefore, these shall fall within the protection scope of the embodiments of the present disclosure.

Figure 1:
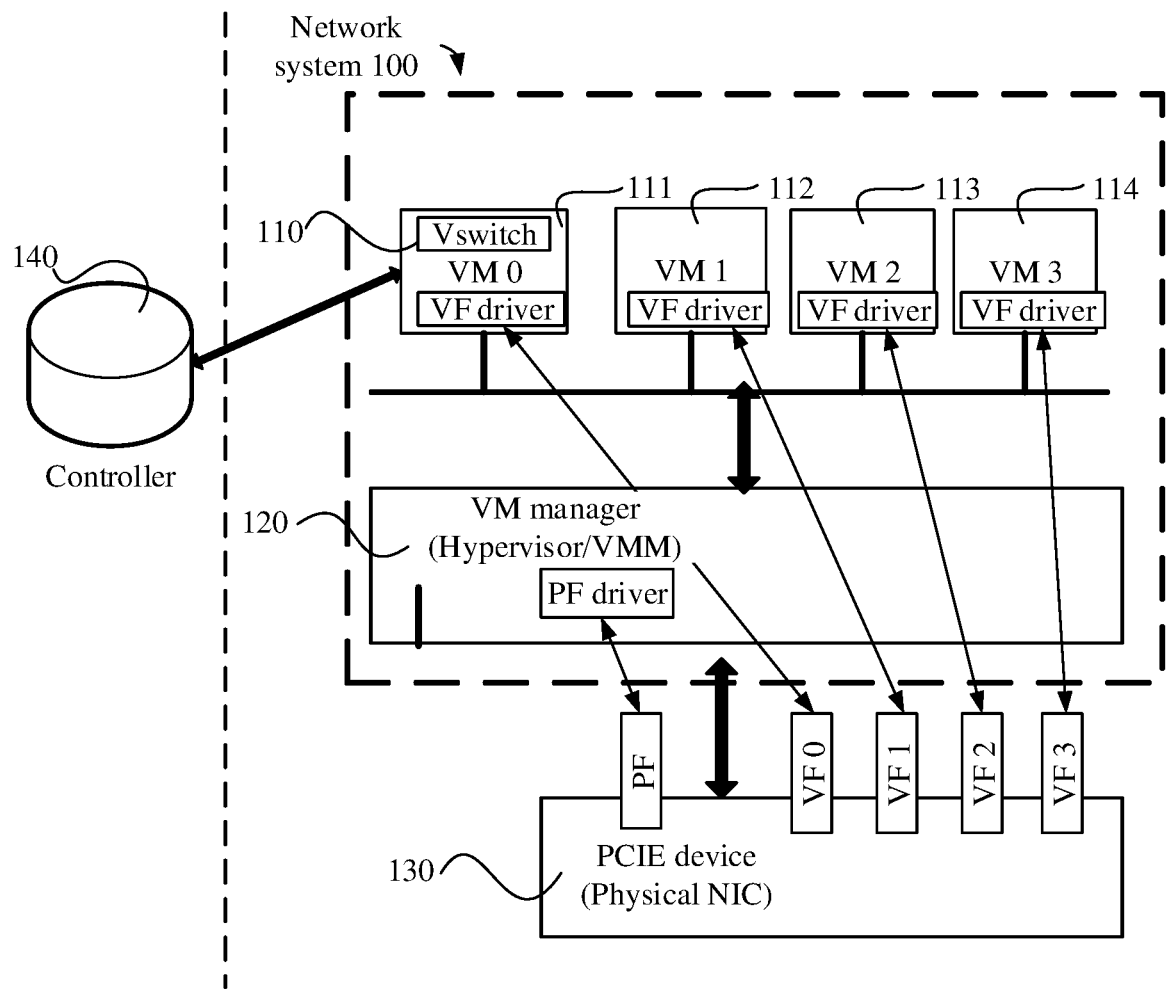
FIG. 1 is a schematic diagram of a logic structure of a network system according to an embodiment of the present disclosure.

As shown in FIG. 1, FIG. 1 is a schematic diagram of a logic structure of a network system 100 according to an embodiment of the present disclosure. The network system 100 includes a VM manager 120, multiple computing VMs 112, 113, and 114 (designated as VM 1 to VM 3), and a PCIE device 130. It should be noted that the multiple computing VMs mean that there are at least two computing VMs in the system 100, and a quantity of the computing VMs does not constitute a limitation to this embodiment of the solution. The quantity of the computing VMs may be adjusted in the system 100 in time according to a requirement. Three computing VMs 112, 113, and 114 are listed herein for convenience of description. The VM manager 120 is connected to the PCIE device 130. The VM manager 120 is configured to manage the multiple computing VMs 112, 113, and 114. By way of example only, but not limitation, FIG. 1 shows a communications link (not numbered). The communications link is used for connection and communication between the VM manager 120 and the PCIE device 130. During implementation, the PCIE device 130 is connected to the VM manager 120 using a PCIE bus link. The PCIE device 130 is a hardware device supporting SR-IOV. The PCIE device 130 includes at least one PF and at least one VF. For convenience of description, FIG. 1 shows only one PF and four VFs (designated as VF 0, VF 1, VF 2 and VF 3). A PF driver may directly access all resources of the PF, and is responsible for configuring and managing all VFs. The PF driver is mainly responsible for configuring public resources of an SR-IOV device, and managing a global function of the device. The PF driver managing the PCIE device 130 runs on the VM manager 120. A VF driver managing a corresponding VF runs on the computing VM. It should be noted that, that a corresponding VF does not mean that each computing VM and each VF are bounded and unchangeable, and is intended only to indicate that the computing VM and the VF are in a one-to-one correspondence. For example, a VM 1 corresponds to a VF 1. The VM manager 120 is configured to receive a switch VM creation request, create a switch VM 111 (designated as VM 0) according to the switch VM creation request, respond to a PCI scanning of the switch VM 111, and configure, using the PF driver, the PCIE device 130 to allocate a corresponding network resource to the switch VM 111. The switch VM 111 is configured to run a virtual switch (designated as Vswitch) 110 and switch network data between the multiple computing VMs 112, 113, and 114. In an implementation process, by way of example only, but not limitation, the VM manager 120 may be a management module (for example, a Hypervisor or VMM module) running on a physical server, or may be implemented by a customized logic chip, and is responsible for managing and controlling a VM, including completing operations such as monitoring and changing an attribute and a status of the VM, and creating, migrating, powering on, and powering off the VM.

The PCIE device 130 is configured to receive configuration information of the PF driver, and allocate the corresponding network resource to the switch VM 111 running the virtual switch 110. In an implementation process, the configuration information of the PF driver may be a configuration command sent by the PF driver, or may be various configuration parameters sent by the PF driver. This does not constitute a limitation to this embodiment of the present disclosure. In an implementation process, by way of example only, but not limitation, the PCIE device 130 may be a Physical Network Interface Card (Physical NIC) or another physical device having a data packet processing capability/supporting a network data forwarding function.

The VM manager 120 is further configured to initialize the PCIE device 130 using the PF driver. A default forwarding rule of the initialized PCIE device includes setting a default forwarding port of the PCIE device 130 to a VF 0 corresponding to the switch VM 111.

The PCIE device 130 is further configured to receive an initialization operation of the PF driver, and configure the default forwarding rule according to the initialization operation. The default forwarding rule includes setting the default forwarding port of the PCIE device 130 to the VF 0 corresponding to the switch VM 111. That is, when the PCIE device 130 is not limited by another network forwarding rule, all network data packets (including a network data packet sent by an external network and network data packets sent by local VMs such as the VM 1 to the VM 3) received by the PCIE device 130 are sent to the VF 0 corresponding to the switch VM 111.

In this embodiment of the present disclosure, the PCIE device 130 supporting the SR-IOV is used such that a cross-platform virtual switch solution is implemented. The VM manager 120 creates the dedicated switch VM 111 used for network forwarding. The virtual switch 110 runs on the switch VM 111, and the default forwarding rule of the PCIE device 130 is configured using the PF driver such that the default forwarding port of the PCIE device 130 is the switch VM 111, and the switch VM 111 runs on an upper layer of the VM manager 120 and is decoupled from a kernel mode of the VM manager 120, thereby achieving the compatibility with different hypervisors/VMMs, and improving the flexibility of deploying the virtual switch.

In an implementation process, the PCIE device 130 is further configured to receive a data packet, and forward the data packet to the switch VM 111 according to the default forwarding rule using the VF 0 corresponding to the switch VM 111.

The switch VM 111 is configured to receive, using the corresponding VF 0 corresponding to the switch VM 111, the data packet forwarded by the PCIE device 130, and perform, according to a preset network forwarding rule, which is not limited in this embodiment of the present disclosure, and may be actually various network forwarding protocols, corresponding network forwarding process on the data packet forwarded by the PCIE device 130. The virtual switch 110 running on the switch VM 111 processes the network data packet.

In this embodiment of the present disclosure, all data packets received by the PCIE device 130, including the data packet sent by an external network and the data packets sent by the local VMs (for example, the VM 1 to the VM 3), are sent to the switch VM 111 using the VF 0 by default. In addition, the switch VM 111 can process, according to the preconfigured network forwarding rule, the data packet forwarded by the PCIE device 130. Therefore, the PCIE device 130 can perform flexible data packet network forwarding process together with the dedicated switch VM 111, thereby greatly improving flexibility of deploying the virtual switch.

Optionally, before creating the switch VM 111, the VM manager 120 is further configured to configure the PCIE device 130 using the PF driver. The PCIE device 130 is further configured to reserve the VF 0, a corresponding PCIE address, and a corresponding communication memory resource for the switch VM 111 according to initialization configuration operation information of the VM manager 120. In an implementation process, the initialization configuration operation information of the VM manager 120 may be an initialization operation command sent by the VM manager 120, or may be various initialization parameters sent by the VM manager 120. This does not constitute a limitation to this embodiment of the present disclosure. By way of example only, when the VM manager 120 (using a Hypervisor as an example) is started, the VM manager 120 initializes the PCIE device 130 (for example, an SR-IOV network interface card), loads the corresponding PF driver, performs PF/IOVM configuration, manages all VF functions, and generates corresponding virtual configuration space, and a communication space/communication memory resource for each VF. An IOVM is an SR-IOV manager, and merely a conceptual model, and is responsible for scanning and identifying a PCI device, and may convert the VF into an entire function, and allocate an SR-IOV resource.

In this embodiment of the present disclosure, after receiving an initialization configuration of the VM manager 120, the PCIE device 130 reserves the VF 0, the corresponding PCIE address, and the corresponding communication memory resource in advance for the switch VM 111 running the virtual switch 110 such that after receiving a configuration of the PF driver, the PCIE device 130 can rapidly allocate the corresponding network resource to the switch VM 111, thereby improving system working efficiency.

Optionally, the PCIE device 130 is configured to receive the configuration information of the PF driver, and allocate the reserved VF 0, corresponding PCIE address, and corresponding communication memory resource to the switch VM 111.

According to the technical solution provided in this embodiment of the present disclosure, after receiving the configuration of the PF driver, the PCIE device 130 can rapidly allocate the corresponding network resource to the switch VM 111 according to the pre-allocated VF 0, corresponding PCIE address, and corresponding communication memory resource, thereby improving system working efficiency.

Optionally, the VM manager 120 is configured to initialize a flow table of the PCIE device 130 using the PF driver. The flow table is used to instruct the PCIE device 130 to perform flow table rule matching and processing on the received data packet, and forward the received data packet to the VF 0 corresponding to the switch VM when no match is found.

The PCIE device 130 is configured to receive the flow table sent by the PF driver, and set a default forwarding port of the data packet received by the PCIE device 130 to the VF 0 corresponding to the switch VM 111.

In this embodiment of the present disclosure, the VM manager 120 can write the flow table into the PCIE device 130 using the PF driver such that the PCIE device 130 can process the received network data packet according to the flow table, and send, only when no match is found during flow table matching of the PCIE device 130, the network data packet to the VF 0 corresponding to the switch VM 111, thereby improving network forwarding efficiency of the virtual switch 110, reducing overheads of a processor corresponding to the switch VM 111, and improving system network forwarding efficiency.

During implementation, the PCIE device 130 is further configured to receive the network data packet, perform flow table rule matching on the received network data packet according to the flow table written during initialization performed by the VM manager 120 in the foregoing description, and forward the received the network data packet to the VF 0 corresponding to the switch VM 111 if no match is found.

The switch VM 111 is configured to receive, using the VF 0 corresponding to the switch VM 111, the network data packet forwarded by the PCIE device 130, and perform, according to a local flow table stored by the switch VM 111, flow table matching and processing on the network data packet forwarded by the PCIE device 130.

In this embodiment of the present disclosure, when the PCIE device 130 cannot process the network data packet because no match is found during local flow table matching, the PCIE device 130 can forward the network data packet to the switch VM 111 using the VF 0, and the switch VM 111 performs forwarding process on the network data packet according to the local flow table stored by the switch VM 111, thereby ensuring system stability, and improving a system service processing capability.

In an implementation process, if the switch VM 111 successfully finds, according to the local flow table stored by the switch VM 111, a match for the network data packet forwarded by the PCIE device 130, the switch VM 111 is further configured to buffer the network data packet forwarded by the PCIE device 130, and send flow table update information to the PCIE device 130. By way of example only, if no match is found during flow table matching of the switch VM 111, the switch VM 111 needs to forward the network data packet to a remote controller 140 for further processing. By way of example only, the flow table update information carries a matching rule and a forwarding rule that are used when the switch VM 111 successfully finds a match for the network data packet. The flow table update information is used to update the flow table of the PCIE device 130.

The PCIE device 130 is further configured to receive the flow table update information sent by the switch VM 111, and instruct the VM manager 120 to process the flow table update information.

The VM manager 120 is further configured to obtain the flow table update information, and write the flow table update information into the PCIE device 130 using the PF driver.

The PCIE device 130 is further configured to receive the flow table update information written by the PF driver, and update the flow table of the PCIE device 130 according to the flow table update information.

In this embodiment of the present disclosure, when successfully finding, according to the local flow table stored by the switch VM 111, a match for the network data packet forwarded by the PCIE device 130, the switch VM 111 can send the flow table update information (by way of example only, the flow table update information carries the matching rule and the forwarding rule that are used when the switch VM 111 successfully finds a match for the network data packet) to the PCIE device 130 such that the PCIE device 130 updates the flow table of the PCIE device 130 according to the flow table update information, and the PCIE device 130 can directly perform matching and forwarding process on subsequent data packets of a same flow (that is, data packets the same as the data packet for which the switch VM 111 successfully finds a match during the flow table matching), thereby reducing overheads of the processor corresponding to the switch VM 111, and improving system network forwarding efficiency.

Optionally, if the PF driver communicates with a VF driver of each VM (including the computing VMs 112, 113 and 114 and the switch VM 111) using a doorbell and mailbox mechanism (it should be noted that the doorbell and mailbox mechanism is proposed by INTEL corporation, and is a PCIE-hardware-based mechanism used to implement communication between a PF driver of an SR-IOV device and a VF driver), the switch VM 111 is configured to send the flow table update information to a mailbox (not shown) corresponding to the switch VM 111, and trigger first doorbell interrupt information (during implementation, a VF driver corresponding to the switch VM 111 may trigger the first doorbell interrupt information). The first doorbell interrupt information is used to instruct the PCIE device 130 to process the flow table update information.

The PCIE device 130 is configured to receive the flow table update information using the mailbox corresponding to the switch VM 111, and send the first doorbell interrupt information to the VM manager 120 (during implementation, the VM manager 120 is notified of the first doorbell interrupt information using a communication mechanism between the PF and the PF driver).

The VM manager 120 is configured to receive the first doorbell interrupt information forwarded by the PCIE device 130, read mailbox information in the mailbox corresponding to the first doorbell interrupt information, when the mailbox information is information for configuring the flow table of the PCIE device 130, further determine whether the mailbox information corresponding to the first doorbell interrupt information belongs to a VF corresponding to the switch VM 111, and if the mailbox corresponding to the first doorbell interrupt information belongs to the VF corresponding to the switch VM 111, store the mailbox information as the flow table update information (by way of example only, if the mailbox corresponding to the first doorbell interrupt information does not belong to the switch VM 111, the mailbox information is discarded).

In this embodiment of the present disclosure, the switch VM 111 can send and notify the flow table update information to the PCIE device 130 using the mailbox and doorbell mechanism such that the PCIE device 130 instructs the VM manager 120 to perform authentication process on the flow table update information, and when recognizing that the flow table update information is sent by the switch VM 111, the VM manager 120 can write the flow table update information into the PCIE device 130 using the PF driver, and update the flow table stored by the PCIE device 130. This makes it simple and convenient to update the flow table of the PCIE device 130.

Optionally, the PCIE device 130 is further configured to send second doorbell interrupt information to the switch VM 111. The second doorbell interrupt information is used to notify the switch VM 111 that the flow table update information has been successfully written into the flow table of the PCIE device 130.

The switch VM 111 is further configured to receive the second doorbell interrupt information sent by the PCIE device 130, and send, according to the local flow table of the switch VM 111, the buffered network data packet forwarded by the PCIE device 130.

Figure 2:
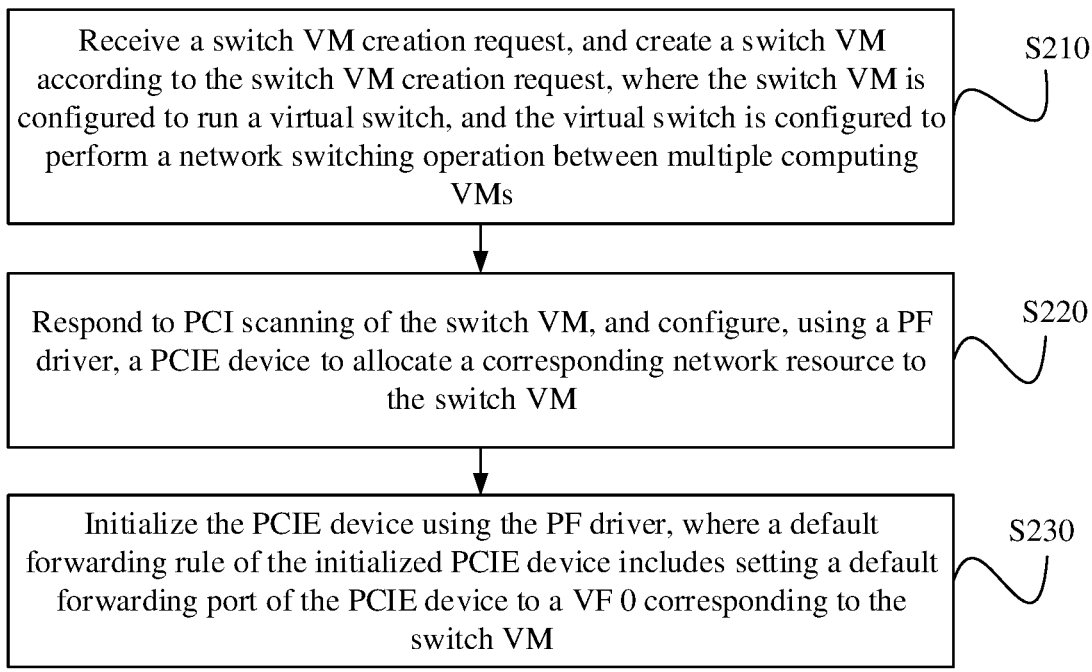
FIG. 2 is a flowchart of a network virtualization configuration method according to an embodiment of the present disclosure.

FIG. 2 is a flowchart of a method for configuring a network according to an embodiment of the present disclosure. The network (by way of example only, but not limitation, as shown by the network system 100 shown in FIG. 1) includes a VM manager, multiple computing VMs, and a PCIE device, the VM manager is connected to the PCIE device, the VM manager is configured to manage the multiple computing VMs, the PCIE device is a hardware device supporting an SR-IOV standard, the PCIE device includes at least one PF and at least one VF, a PF driver managing the PCIE device runs on the VM manager, a VF is configured in each computing VM, and a VF driver configured to manage the VF runs on the computing VM. As shown in FIG. 2, the method includes the following steps.

Step S210: Receive a switch VM creation request, and create a switch VM according to the switch VM creation request, where the switch VM is configured to run a virtual switch, and the virtual switch is configured to implement network switching between the multiple computing VMs.

Step S220: Respond to PCI scanning of the switch VM, and configure, using the PF driver, the PCIE device to allocate a corresponding network resource to the switch VM.

Step S230: Initialize the PCIE device using the PF driver, where a default forwarding rule of the initialized PCIE device includes setting a default forwarding port of the PCIE device to a VF 0 corresponding to the switch VM.

According to the technical solution provided in this embodiment of the present disclosure, the VM manager creates a dedicated switch VM used for network forwarding, the virtual switch runs on the switch VM, and the PCIE device supporting the SR-IOV is used such that a cross-platform virtual switch solution is implemented. The VM manager initializes the PCIE device using the PF driver such that the default forwarding port of the PCIE device is the switch VM, thereby achieving compatibility with different hypervisors/VMMs, and improving flexibility of deploying the virtual switch.

Optionally, before step S210, the method further includes configuring, using the PF driver, the PCIE device to reserve the VF 0, a corresponding PCIE address, and a corresponding communication memory resource for the switch VM.

According to the technical solution provided in this embodiment of the present disclosure, before creating the switch VM, the VM manager initializes the PCIE device using the PF driver, and reserves the VF 0, the corresponding PCIE address, and the corresponding communication memory resource in advance for the virtual switch such that the PCIE device makes preparation for subsequent resource allocation to the switch VM, and system working efficiency is improved.

Optionally, configuring, using the PF driver, the PCIE device to allocate a corresponding network resource to the switch VM in step S220 includes configuring, using the PF driver, the PCIE device to allocate the reserved VF 0, corresponding PCIE address, and corresponding communication memory resource to the switch VM.

According to the technical solution provided in this embodiment of the present disclosure, the VM manager can configure the PCIE device using the PF driver such that after receiving a configuration of the PF driver, the PCIE device can rapidly allocate the corresponding network resource to the switch VM according to the pre-allocated VF 0, corresponding PCIE address, and corresponding communication memory resource, thereby improving system working efficiency.

Optionally, in an implementation process, initializing the PCIE device using the PF driver includes initializing a flow table of the PCIE device using the PF driver, where the flow table is used to instruct the PCIE device to perform flow table rule matching and processing on a received data packet, and forward the received data packet to the VF 0 corresponding to the switch VM when no match is found.

According to the technical solution provided in this embodiment of the present disclosure, the VM manager can write the flow table into the PCIE device using the PF driver such that the PCIE device can process the received network data packet according to the flow table, and send, only when no match is found during flow table matching of the PCIE device, the network data packet to the VF 0 corresponding to the switch VM, thereby improving network forwarding efficiency of the virtual switch, reducing overheads of a processor corresponding to the switch VM, and improving system network forwarding efficiency.

Optionally, during implementation, after initializing a flow table of the PCIE device using the PF driver, the method further includes obtaining flow table update information, where the flow table update information is used to update the flow table of the PCIE device, and writing the flow table update information into the PCIE device using the PF driver.

According to the technical solution provided in this embodiment of the present disclosure, the VM manager can obtain the flow table update information, and write the flow table update information into the PCIE device, thereby improving a network processing capability of the PCIE device, and improving a system service processing capability.

Optionally, if the PF driver communicates with a VF driver of each VM using a doorbell and mailbox mechanism, obtaining flow table update information includes receiving, using the PF driver, doorbell interrupt information sent by the PCIE device, reading, according to the doorbell interrupt information sent by the PCIE device, mailbox information in a mailbox corresponding to the doorbell interrupt information, determining whether the mailbox corresponding to the doorbell interrupt information belongs to a VF corresponding to the switch VM when the mailbox information is information for configuring the flow table of the PCIE device, and saving the mailbox information as the flow table update information if the mailbox corresponding to the doorbell interrupt information belongs to the VF corresponding to the switch VM.

According to the technical solution provided in this embodiment of the present disclosure, the VM manager can learn and read the flow table update information on the PCIE device using the doorbell and mailbox mechanism to perform authentication process, and when recognizing that the flow table update information is sent by the switch VM, the VM manager can write the flow table update information into the PCIE device using the PF driver to update the flow table stored in the PCIE device. This makes it simple and convenient to update the flow table of the PCIE device.

Figure 3:
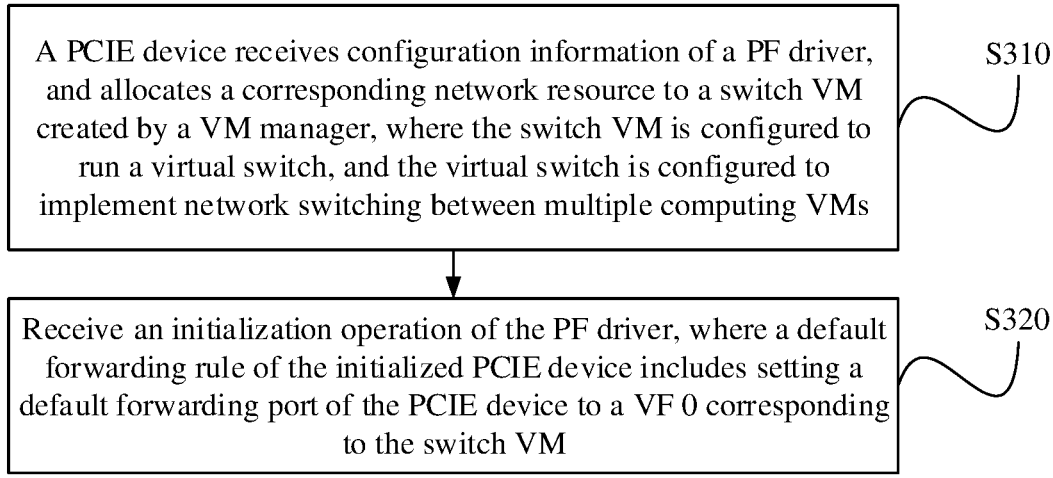
FIG. 3 is a flowchart of a network virtualization configuration method according to an embodiment of the present disclosure.

FIG. 3 is a flowchart of a method for configuring a network according to an embodiment of the present disclosure. The network (by way of example only, but not limitation, as shown by the network system 100 shown in FIG. 1) includes a VM manager, multiple computing VMs, and a PCIE device, the VM manager is configured to manage the multiple computing VMs, the VM manager is connected to the PCIE device, the PCIE device is a hardware device supporting an SR-IOV standard, the PCIE device includes at least one PF and at least one VF, a PF driver managing the PCIE device runs on the VM manager, a corresponding VF is configured in each computing VM, and a VF driver managing the corresponding VF runs on the computing VM. As shown in FIG. 3, the method includes the following steps.

Step S310: The PCIE device receives configuration information of the PF driver, and allocates a corresponding network resource to a switch VM running a virtual switch, where the virtual switch is configured to implement network switching between multiple computing VMs, and the switch VM is created by the VM manager.

Step S320: Receive an initialization operation of the PF driver, and configure a default forwarding rule according to the initialization operation, where the default forwarding rule includes setting a default forwarding port of the PCIE device to a VF 0 corresponding to the switch VM.

According to the technical solution provided in this embodiment of the present disclosure, the PCIE device supporting the SR-IOV is used such that a cross-platform virtual switch solution is implemented. The VM manager creates a dedicated switch VM used for network forwarding, the virtual switch runs on the switch VM, and the PCIE device receives a configuration of the PF driver of the VM manager to allocate the corresponding network resource to the switch VM, and receives the initialization operation of the PF driver to configure a network port such that the default forwarding port of the PCIE device is the VF 0 corresponding to the switch VM. The switch VM runs on an upper layer of the VM manager and is decoupled from a kernel mode of the VM manager, thereby achieving compatibility with different hypervisors/VMMs, and improving flexibility of deploying the virtual switch.

Optionally, before step S310, the method further includes receiving initialization configuration operation information of the VM manager, and reserving the VF 0, a corresponding PCIE address, and a corresponding communication memory resource for the switch VM according to the initialization configuration operation information.

According to the technical solution provided in this embodiment of the present disclosure, after receiving an initialization configuration of the VM manager, the PCIE device can reserve the VF 0, the corresponding PCIE address, and the corresponding communication memory resource in advance for the switch VM running the virtual switch such that after receiving the configuration of the PF driver, the PCIE device can rapidly allocate the corresponding network resource to the switch VM, thereby improving system working efficiency.

Optionally, allocating a corresponding network resource to a switch VM running a virtual switch in step S310 includes allocating the reserved VF 0, corresponding PCIE address, and corresponding communication memory resource to the switch VM.

According to the technical solution provided in this embodiment of the present disclosure, after receiving the configuration of the PF driver, the PCIE device can rapidly allocate the corresponding network resource to the switch VM according to the pre-allocated VF 0, corresponding PCIE address, and corresponding communication memory resource, thereby improving system working efficiency.

Optionally, receiving an initialization operation of the PF driver, and configuring a default forwarding rule according to the initialization operation in step S320 includes receiving a flow table sent by the PF driver, where the flow table is used to instruct the PCIE device to perform flow table rule matching and processing on a received data packet, and forward the received data packet to the VF 0 corresponding to the switch VM when no match is found, and setting a default forwarding port of the data packet received by the PCIE device to the VF 0 corresponding to the switch VM.

According to the technical solution provided in this embodiment of the present disclosure, the PCIE device can receive, using the PF driver, the flow table written by the VM manager such that the PCIE device can process the received network data packet according to the flow table, and send, only when no match is found during flow table matching, the network data packet to the switch VM, thereby reducing overheads of a processor corresponding to the switch VM, and improving system network forwarding efficiency.

During implementation, after receiving a flow table sent by the PF driver, the method further includes receiving a network data packet, and performing flow table rule matching on the received network data packet according to the flow table, and forwarding, if no match is found, the received network data packet to the VF 0 corresponding to the switch VM.

According to the technical solution provided in this embodiment of the present disclosure, when the PCIE device cannot process the network data packet because no match is found during local flow table matching, the PCIE device can forward the network data packet to the switch VM using the VF 0, and the switch VM forwards the network data packet according to the local flow table stored by the switch VM, thereby ensuring system stability, and improving a system service processing capability.

Optionally, after forwarding, if no match is found, the received network data packet to the VF 0 corresponding to the switch VM, if the switch VM successfully finds a match in the local flow table, the method further includes receiving flow table update information sent by the switch VM, where the flow table update information is used to update a flow table of the PCIE device, instructing the VM manager to process the flow table update information, receiving the flow table update information written by the PF driver, and updating the flow table of the PCIE device according to the flow table update information.

According to the technical solution provided in this embodiment of the present disclosure, the PCIE device can receive the flow table update information (by way of example only, the flow table update information carries a matching rule and a forwarding rule that are used when the switch VM successfully finds a match for the network data packet) sent by the switch VM such that the PCIE device can update the flow table of the PCIE device according to the flow table update information, and the PCIE device can directly perform matching and forwarding process on subsequent data packets of a same flow (that is, data packets the same as the data packet for which the switch VM successfully finds a match during the flow table matching), thereby reducing overheads of a processor corresponding to the switch VM, and improving system network forwarding efficiency.

Optionally, if the PF driver communicates with a VF driver of each VM using a doorbell and mailbox mechanism, receiving flow table update information sent by the switch VM includes receiving the flow table update information using a mailbox corresponding to the switch VM, and instructing the VM manager to process the flow table update information includes forwarding first doorbell interrupt information to the VM manager, where the first doorbell interrupt information is triggered by the virtual switch to instruct the PCIE device to process the flow table update information.

According to the technical solution provided in this embodiment of the present disclosure, the PCIE device can learn and receive, using the mailbox and doorbell mechanism, the flow table update information sent by the switch VM, and instruct the VM manager to perform authentication process on the flow table update information. This makes it simple and convenient to update the flow table of the PCIE device.

Optionally, after updating the flow table of the PCIE device according to the flow table update information, the method further includes sending second doorbell interrupt information to the switch VM, where the second doorbell interrupt information is used to notify the switch VM that the flow table update information has been successfully written into the flow table of the PCIE device.

Figure 4:
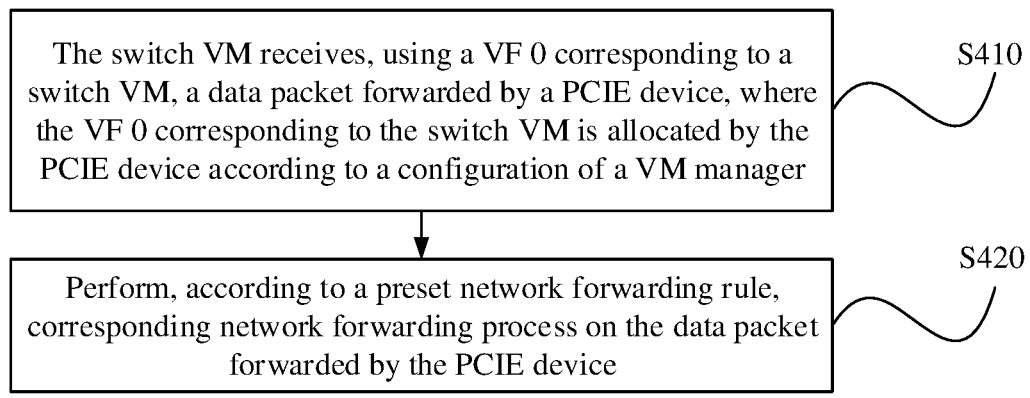
FIG. 4 is a flowchart of a network virtualization configuration method according to an embodiment of the present disclosure.

FIG. 4 is a flowchart of a method for configuring a network according to an embodiment of the present disclosure. The network (by way of example only, but not limitation, as shown by the network system 100 shown in FIG. 1) includes a VM manager, multiple computing VMs, and a PCIE device, the VM manager is connected to the PCIE device, the VM manager is configured to manage the multiple computing VMs, the VM manager is further configured to receive a switch VM creation request, and create a switch VM according to the switch VM creation request, the switch VM is configured to run a virtual switch, and the virtual switch is configured to implement network switching between the multiple computing VMs. The PCIE device is a hardware device supporting an SR-IOV standard, the PCIE device includes at least one PF and at least one VF, a PF driver managing the PCIE device runs on the VM manager, a corresponding VF is configured in each computing VM, and a VF driver managing the corresponding VF runs on the computing VM. As shown in FIG. 4, the method includes the following steps.

Step S410: The switch VM receives, using a VF 0 corresponding to the switch VM, a data packet forwarded by the PCIE device, where the VF 0 corresponding to the switch VM is allocated by the PCIE device according to a configuration of the VM manager.

Step S420: Perform, according to a preset network forwarding rule, corresponding network forwarding process on the data packet forwarded by the PCIE device.

In this embodiment of the present disclosure, the PCIE device supporting the SR-IOV is used such that a cross-platform virtual switch solution is implemented. The switch VM can receive the data packet from the PCIE device using the VF 0, and the virtual switch running on the switch VM performs corresponding process on the data packet according to the preset network forwarding rule. The switch VM runs on an upper layer of the VM manager and is decoupled from a kernel mode of the VM manager, thereby achieving compatibility with different hypervisors/VMMs, and improving flexibility of deploying the virtual switch.

Optionally, if the preset network forwarding rule is a local flow table of the switch VM, performing, according to a preset network forwarding rule, corresponding network forwarding process on the data packet forwarded by the PCIE device includes performing, according to the local flow table of the switch VM, flow table matching on the data packet forwarded by the PCIE device, and if a match is successfully found, buffering the data packet forwarded by the PCIE device, and sending flow table update information to the PCIE device, where the flow table update information is used to update a flow table of the PCIE device. By way of example only, the flow table update information carries a matching rule and a forwarding rule that are used when the switch VM successfully finds a match for the data packet.

In this embodiment of the present disclosure, the switch VM can send the flow table update information to the PCIE device when successfully finding, according to the local flow table stored by the switch VM, a match for the data packet forwarded by the PCIE device such that the PCIE device updates the flow table of the PCIE device according to the flow table update information, and the PCIE device can directly perform matching and forwarding process on subsequent data packets of a same flow (that is, data packets the same as the data packet for which the switch VM successfully finds a match during the flow table matching), thereby reducing overheads of a processor corresponding to the switch VM, and improving system network forwarding efficiency.

Optionally, if the PF driver communicates with each VF driver using a doorbell and mailbox mechanism, sending flow table update information to the PCIE device includes sending the flow table update information to a mailbox corresponding to the switch VM, and triggering first doorbell interrupt information, where the first doorbell interrupt information is used to instruct the PCIE device to process the flow table update information.

Optionally, after sending the flow table update information to a mailbox corresponding to the switch VM, and triggering first doorbell interrupt information, the method further includes receiving second doorbell interrupt information sent by the PCIE device, where the second doorbell interrupt information is used to notify the switch VM that the flow table update information has been successfully written into the flow table of the PCIE device, and sending, according to the local flow table of the switch VM, the buffered data packet forwarded by the PCIE device.

Figure 5A:
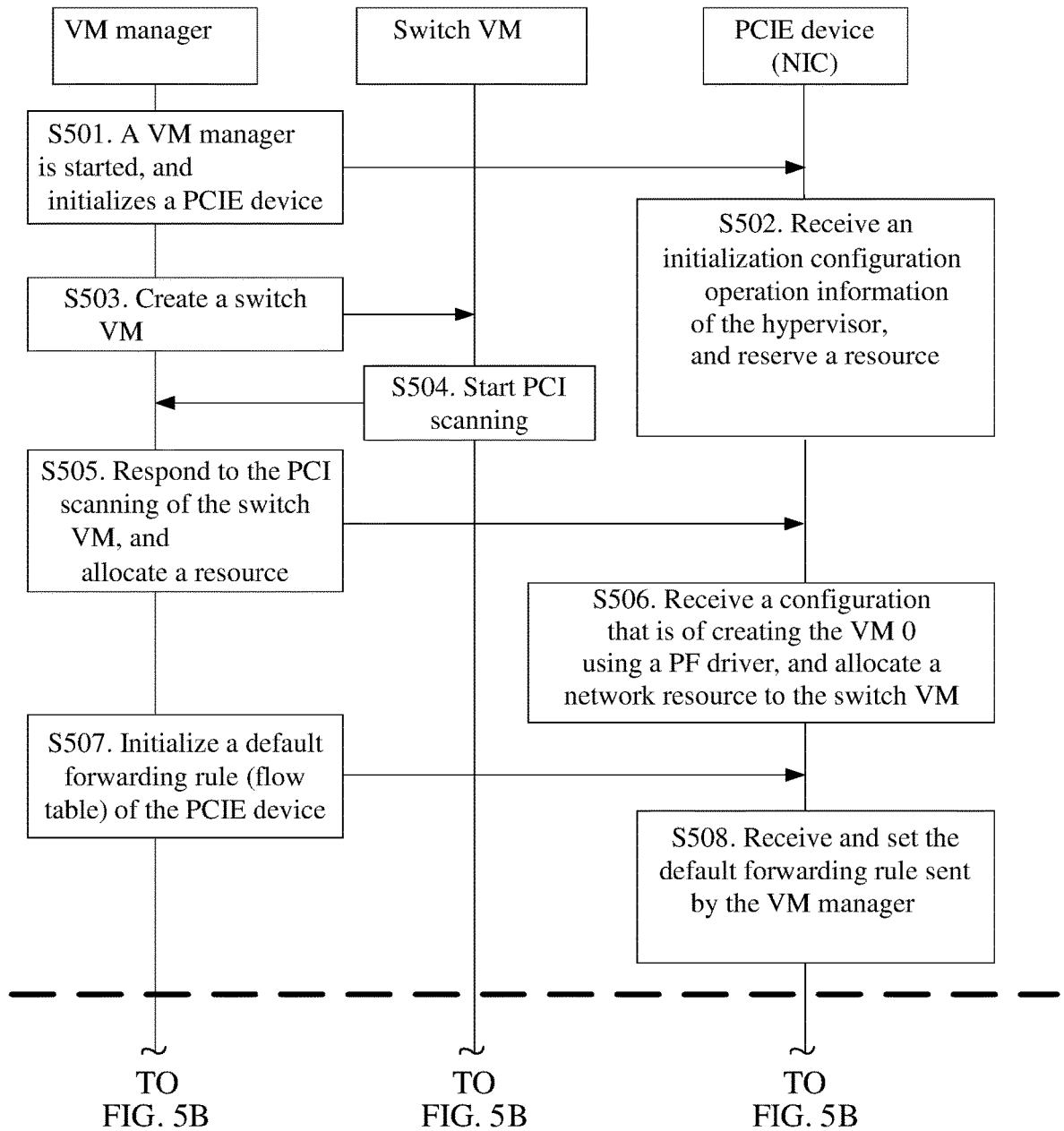
FIG. 5A and FIG. 5B are a flowchart of a network virtualization configuration method and network data packet processing according to an embodiment of the present disclosure.
Figure 5B:
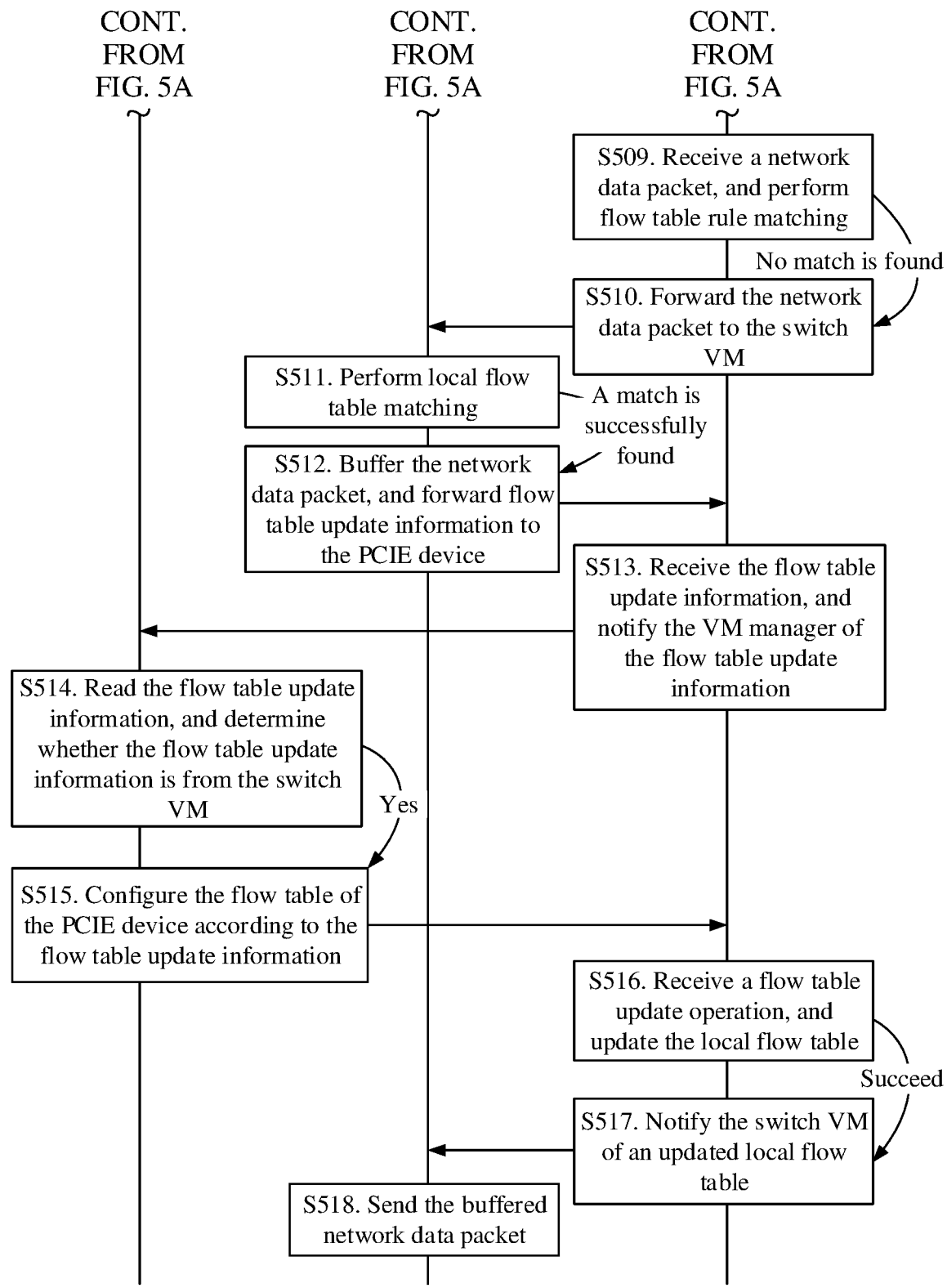

FIG. 5A and FIG. 5B are a flowchart of a method for configuring a network and network data packet processing according to an embodiment of the present disclosure. The network (by way of example only, but not limitation, as shown by the network system 100 shown in FIG. 1) includes a VM manager, multiple computing VMs, and a PCIE device, the VM manager is connected to the PCIE device, the VM manager is configured to manage the multiple computing VMs, the PCIE device is a hardware device supporting an SR-IOV standard, the PCIE device includes at least one PF and at least one VF, a PF driver managing the PCIE device runs on the VM manager, a corresponding VF is configured in each computing VM, and a VF driver managing the corresponding VF runs on the computing VM. It should be noted that although a procedure of the method described below includes multiple operations appearing in a particular sequence, it should be understood that these operations may include more or fewer operations, and these operations may be executed sequentially or concurrently (for example, a concurrent processor or a multi-thread environment is used). As shown in FIG. 5A and FIG. 5B, the method includes the following steps.

Step S501: The VM manager (by way of example only, the VM manager is a hypervisor or a VMM, and following uses the hypervisor to represent the VM manager) is started, loads a corresponding PF driver, and initializes a configuration of the PCIE device (by way of example only, a network interface card (designated as NIC) supporting the SR-IOV is used to represent the PCIE device). Operations are as follows.

(a) The hypervisor performs PF/IOVM configuration, manages all VF resource of the NIC, and generates corresponding virtual configuration space, and communication space between a PF (driver) and a VF (driver) for each VF. By way of example only, but not limitation, mailbox communication space is used as an example. That is, the PF driver and the VF driver communicate with each other using a mailbox and doorbell mechanism of Intel.

(b) Reserve, according to a configuration of a resource management center, a corresponding network resource for a switch VM running a virtual switch (designated as vswitch). By way of example only, but not limitation, the corresponding network resource includes a particular VF (designated as VF 0), a PCIE address, and mailbox space.

Step S502: The NIC receives initialization configuration operation information of the hypervisor, and reserve a resource, that is, reserves the VF 0, a corresponding PCIE address, and a corresponding communication memory resource (i.e., mailbox space) for the VM 0 according to the initialization configuration operation information.

Step S503: The hypervisor receives a switch VM creation request, and creates, according to the switch VM creation request, a switch VM (designated as VM 0) running a vswitch.

Step S504: The VM 0 starts PCI scanning, and applies for a network resource from the hypervisor.

Step S505: The hypervisor responds to the PCI scanning of the VM 0, and allocates a resource, that is a corresponding network resource to the VM 0. Operations are as follows.

(a) The hypervisor configures a PCIE address (reserved in step S501) for the VM 0 using the PF driver, and responds to driver scanning of the VM 0.

(b) The hypervisor allocates a particular VF queue (i.e., VF 0) and a related mailbox communication resource (reserved in step S501) to the VM 0 using the PF driver.

Step S506: The NIC receives a configuration that is of creating the VM 0 and that is sent by the hypervisor using the PF driver, and allocates the corresponding network resource to the VM 0. Preferably, the VF 0, the corresponding PCIE address, and the corresponding communication memory resource (mailbox space) that are reserved in step S502 are allocated to the VM 0.

Step S507: The hypervisor initializes a default forwarding rule (flow table) of the NIC using the PF driver, where the default forwarding rule includes setting a default forwarding port of the PCIE device to a VF 0 corresponding to the switch VM. By way of example only, but not limitation, the hypervisor initializes a flow table of the NIC using the PF driver, and sets the default forwarding port of the NIC to the VF 0 corresponding to the VM 0.

Step S508: The NIC receives and sets the default forwarding rule sent by the VM manager. When there is no other network forwarding rule, the NIC forwards, by default to the VF 0 corresponding to the VM 0, a data packet received from an external network and a network data packet sent by a VF queue corresponding to another VM in the network system.

In this embodiment of the present disclosure, the PCIE device (i.e., NIC) supporting the SR-IOV is used such that a cross-platform virtual switch solution is implemented. The VM manager hypervisor creates a dedicated switch VM (i.e., VM 0) used for network forwarding. The virtual switch runs on the switch VM, and a default forwarding rule of the PCIE device is configured using the PF driver such that the default forwarding port of the PCIE device is the switch VM, and the switch VM runs on an upper layer of the VM manager and is decoupled from a kernel mode of the VM manager, thereby achieving the compatibility with different VM managers, and improving flexibility of deploying the virtual switch.

The following describes in detail a procedure of a method for forwarding, by the network system, a data packet. The method is as follows.

Step S509: The NIC receives a network data packet, and performs flow table rule matching on the received network data packet, where the network data packet is sent by the external network or another VM does not constitute a limitation to this embodiment of the present disclosure.

Step S510: If no match is found, forward the network data packet to the VF 0 corresponding to the VM 0. By way of supplementary description only, but not limitation, if a match is successfully found, the data packet is directly forwarded according to the flow table.

Step S511: After receiving the network data packet, the VM 0 queries a local flow table of the VM 0, to perform flow table matching.

Step S512: If the VM 0 successfully finds a match in the local flow table, buffer the corresponding network data packet, and forward flow table update information to the PCIE device. That is write a corresponding flow table forwarding rule into a mailbox corresponding to the VF 0, and instruct the PF driver to perform processing using a doorbell interrupt. By way of supplementary description only, but not limitation, if a related flow table is not found (that is, no match is found), the network data packet is sent to a controller for further processing.

Step S513: The NIC receives flow table update information and notify the VM manager of the flow table update information. That is the NIC receives a doorbell interrupt notification of the VM 0, and instructs, using the PF driver, the hypervisor to perform processing.

Step S514: VM manager reads the flow table update information, and determine whether the flow table update information is from the switch VM. That is after receiving the doorbell interrupt notification, the PF driver of the hypervisor reads configuration information in a corresponding mailbox. By way of example only, if the configuration information is related information of configuring a flow table, the PF driver of the hypervisor determines whether the mailbox is from the VF 0 corresponding to the VM 0, and if the mailbox is not from the VF 0 corresponding to the VM 0, discards the configuration information.

Step S515: Configure the flow table of the PCIE device according to the flow table update information. That is if the mailbox is from the VF 0 corresponding to the VM 0, update the flow table of the network interface card NIC according to related information (i.e., a flow table forwarding rule and a matching rule) in the mailbox using the PF driver.

Step S516: The NIC receives flow table update operation, that is the flow table forwarding rule and matching rule that are written by the PF driver, and updates the flow table of the NIC.

Step S517: If modification succeeds, the NIC notifies the switch VM of an updated local flow table, that is notify, using a doorbell mechanism, the VF driver corresponding to the VM 0 of the modification.

Step S518: After receiving an interrupt signal indicating that update configuration of the flow table of the NIC succeeds, the VF driver of the VM 0 sends, based on the matching rule, the network data packet buffered in step S512.

Figure 6:
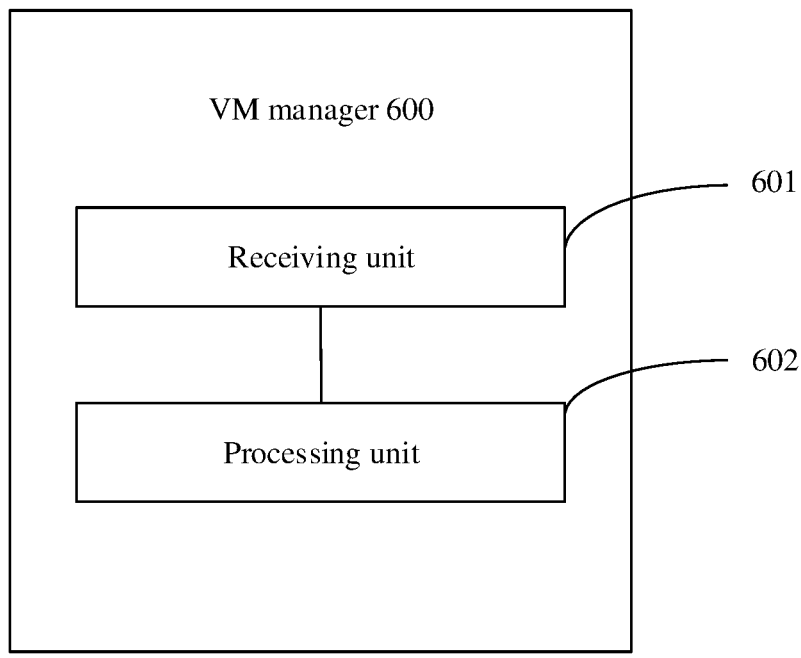
FIG. 6 is a schematic diagram of a logic structure of a VM manager in a network according to an embodiment of the present disclosure.

FIG. 6 is a schematic diagram of a logic structure of a VM manager 600 in a network according to an embodiment of the present disclosure. The network includes the VM manager 600, multiple computing VMs, and a PCIE device, the VM manager 600 is connected to the PCIE device, the VM manager 600 is configured to manage the multiple computing VMs, the PCIE device is a hardware device supporting an SR-IOV standard, the PCIE device includes at least one PF and at least one VF, a PF driver managing the PCIE device runs on the VM manager 600, a corresponding VF is configured in each computing VM, and a VF driver managing the corresponding VF runs on the computing VM (by way of example only, the VM manager 600 may be applied to, but is not limited to being applied to the network system 100 shown in FIG. 1 or another network system obtained by means of flexible deformation based on the system 100). It should be noted that multiple modules or units are mentioned in this embodiment of the present disclosure. A person skilled in the art should know that functions of the multiple modules or units may be distributed to more sub-modules or subunits, or may be combined into fewer modules or units, to implement the same technical effects. Therefore, these shall fall within the protection scope of the embodiments of the present disclosure.

As shown in FIG. 6, the VM manager 600 includes a receiving unit 601 and a processing unit 602.

The receiving unit 601 is configured to receive a switch VM creation request.

The processing unit 602 is configured to create a switch VM according to the switch VM creation request, where the switch VM is configured to run a virtual switch, and the virtual switch is configured to implement network switching between the multiple computing VMs, and respond to PCI scanning of the switch VM, and configure, using the PF driver, the PCIE device to allocate a corresponding network resource to the switch VM.

The processing unit 602 is further configured to initialize the PCIE device using the PF driver, where a default forwarding rule of the initialized PCIE device includes setting a default forwarding port of the PCIE device to a VF 0 corresponding to the switch VM. Optionally, the processing unit 602 is further configured to configure, using the PF driver, the PCIE device to reserve the VF 0, a corresponding PCIE address, and a corresponding communication memory resource for the switch VM.

Optionally, the processing unit 602 is configured to configure, using the PF driver, the PCIE device to allocate the reserved VF 0, corresponding PCIE address, and corresponding communication memory resource to the switch VM.

Optionally, the processing unit 602 is configured to initialize a flow table of the PCIE device using the PF driver, where the flow table is used to instruct the PCIE device to perform flow table rule matching and processing on a received data packet, and forward the received data packet to the VF 0 corresponding to the switch VM when no match is found.

Optionally, the receiving unit 601 is further configured to obtain flow table update information, where the flow table update information is used to update the flow table of the PCIE device, and the processing unit 602 is further configured to write, using the PF driver, the flow table update information obtained by the receiving unit 601 into the PCIE device.

Optionally, if the PF driver communicates with each VF driver using a doorbell and mailbox mechanism, the receiving unit 601 is configured to receive doorbell interrupt information sent by the PCIE device, and read, according to the doorbell interrupt information sent by the PCIE device, mailbox information in a mailbox corresponding to the doorbell interrupt information, when the mailbox information is information about configuring the flow table of the PCIE device, the processing unit 602 is configured to determine whether the mailbox corresponding to the doorbell interrupt information belongs to a VF corresponding to the switch VM, and if the mailbox corresponding to the doorbell interrupt information belongs to the VF corresponding to the switch VM, the receiving unit 601 is configured to store the mailbox information as the flow table update information.

Figure 7:
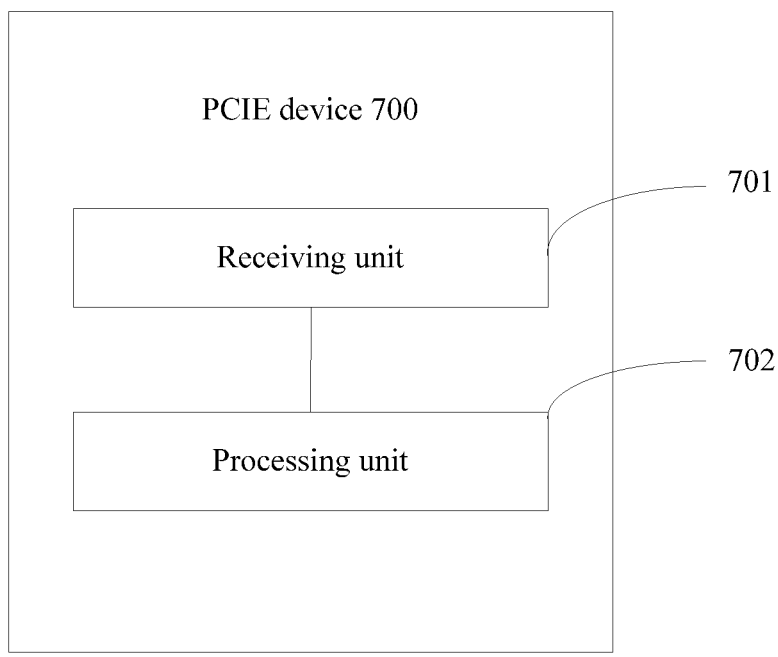
FIG. 7 is a schematic diagram of a logic structure of a PCIE device in a network according to an embodiment of the present disclosure.

FIG. 7 is a schematic diagram of a logic structure of a PCIE device 700 in a network according to an embodiment of the present disclosure. The network includes a VM manager, multiple computing VMs, and the PCIE device 700, the VM manager is connected to the PCIE device 700, the VM manager is configured to manage the multiple computing VMs, the PCIE device 700 is a hardware device supporting an SR-IOV standard, the PCIE device 700 includes at least one PF and at least one VF, a corresponding VF is configured in each computing VM, and a VF driver managing the corresponding VF runs on the computing VM (by way of example only, the PCIE device 700 may be applied to, but is not limited to being applied to the network system 100 shown in FIG. 1 or another network system obtained by means of flexible deformation based on the system 100). It should be noted that multiple modules or units are mentioned in this embodiment of the present disclosure. A person skilled in the art should know that functions of the multiple modules or units may be distributed to more sub-modules or subunits, or may be combined into fewer modules or units to implement the same technical effects. Therefore, these shall fall within the protection scope of the embodiments of the present disclosure.

As shown in FIG. 7, the PCIE device 700 includes a receiving unit 701 and a processing unit 702.

The receiving unit 701 is configured to receive configuration information of the PF driver.

The processing unit 702 is configured to allocate, according to the configuration received by the receiving unit 701, a corresponding network resource to a switch VM running a virtual switch, where the switch VM is created by the VM manager, and the virtual switch is configured to implement network switching between the multiple computing VMs.

The receiving unit 701 is further configured to receive an initialization operation of the PF driver.

The processing unit 702 is further configured to set, according to the initialization operation received by the receiving unit 701, a default forwarding port of the PCIE device 700 to a VF 0 corresponding to the switch VM.

Optionally, the receiving unit 701 is further configured to receive initialization configuration operation information of the VM manager, and the processing unit 702 is further configured to reserve the VF 0, a corresponding PCIE address, and a corresponding communication memory resource for the switch VM according to the initialization configuration operation information received by the receiving unit 701.

Optionally, the processing unit 702 is configured to allocate the reserved VF 0, corresponding PCIE address, and corresponding communication memory resource to the switch VM.

Optionally, the receiving unit 701 is configured to receive a flow table sent by the PF driver, where the flow table is used to instruct the PCIE device 700 to perform flow table rule matching and processing on a received data packet, and forward the received data packet to the VF 0 corresponding to the switch VM when no match is found, and the processing unit 702 is configured to set a default forwarding port of the data packet received by the PCIE device 700 to the VF 0 corresponding to the switch VM.

Optionally, the receiving unit 701 is further configured to receive a network data packet, and the processing unit 702 is further configured to perform, according to the flow table, flow table rule matching on the network data packet received by the receiving unit 701, and if no match is found, the processing unit 702 is further configured to forward the network data packet received by the receiving unit 701 to the VF 0 corresponding to the switch VM.

Optionally, the PCIE device 700 further includes a notification unit (not shown), and the receiving unit 701 is further configured to receive flow table update information sent by the switch VM, where the flow table update information is used to update the flow table of the PCIE device 700, the notification unit is configured to instruct the VM manager to process the flow table update information, the receiving unit 701 is further configured to receive the flow table update information written by the PF driver, and the processing unit 702 is further configured to update the flow table of the PCIE device 700 according to the flow table update information received by the receiving unit 701.

Optionally, if the PF driver communicates with each VF driver using a doorbell and mailbox mechanism, the receiving unit 701 is configured to receive the flow table update information using a mailbox corresponding to the switch VM, and the notification unit is configured to forward first doorbell interrupt information to the VM manager, where the first doorbell interrupt information is triggered by the virtual switch to instruct the PCIE device 700 to process the flow table update information.

Optionally, the notification unit is further configured to send second doorbell interrupt information to the switch VM, where the second doorbell interrupt information is used to notify the switch VM that the flow table update information has been successfully written into the flow table of the PCIE device 700.

Figure 8:
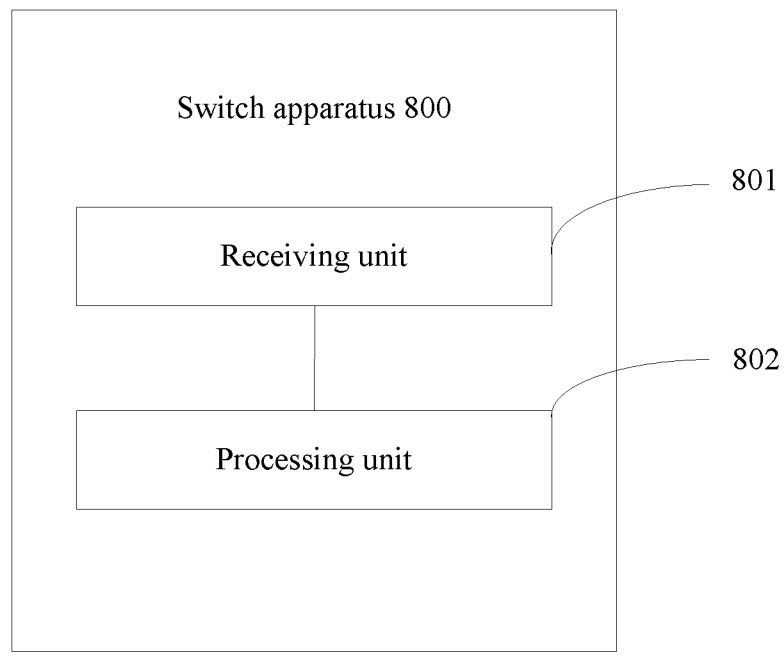
FIG. 8 is a schematic diagram of a logic structure of a switch apparatus in a network according to an embodiment of the present disclosure.

FIG. 8 is a schematic diagram of a logic structure of a switch apparatus 800 in a network according to an embodiment of the present disclosure. The network includes a VM manager, multiple computing VMs, a switch VM, the switch apparatus 800, and a PCIE device, the switch VM is created by the VM manager, and is configured to run the switch apparatus 800, the switch apparatus 800 is configured to perform a network switching operation between the multiple computing VMs, the VM manager is connected to the PCIE device, the PCIE device is a hardware device supporting an SR-IOV standard, the PCIE device includes at least one PF and at least one VF, a PF driver managing the PCIE device runs on the VM manager, a corresponding VF is configured in each computing VM and the switch VM, and a VF driver managing the corresponding VF runs on the computing VM and the switch VM (by way of example only, the switch apparatus 800 may be applied to, but is not limited to being applied to the network system 100 shown in FIG. 1 or another network system obtained by means of flexible deformation based on the system 100). It should be noted that multiple modules or units are mentioned in this embodiment of the present disclosure. A person skilled in the art should know that functions of the multiple modules or units may be distributed to more sub-modules or subunits, or may be combined into fewer modules or units to implement the same technical effects. Therefore, these shall fall within the protection scope of the embodiments of the present disclosure.

As shown in FIG. 8, the switch apparatus 800 includes a receiving unit 801 and a processing unit 802.

The receiving unit 801 is configured to receive, using a VF 0 corresponding to the switch VM, a data packet forwarded by the PCIE device, where the VF 0 corresponding to the switch VM is allocated by the PCIE device according to a configuration of the VM manager.

The processing unit 802 is configured to perform, according to a preset network forwarding rule, corresponding network forwarding process on the data packet forwarded by the PCIE device.

Optionally, the switch apparatus 800 further includes a sending unit (not shown), the preset network forwarding rule is a local flow table of the switch apparatus 800, and the processing unit 802 is configured to perform, according to the local flow table of the switch apparatus 800, flow table matching on the data packet forwarded by the PCIE device, and if a match is successfully found, the processing unit 802 is further configured to buffer the data packet forwarded by the PCIE device, and the sending unit is configured to send flow table update information to the PCIE device, where the flow table update information is used to update a flow table of the PCIE device.

Optionally, if the PF driver communicates with a VF driver of each VM using a doorbell and mailbox mechanism, the sending unit is configured to send the flow table update information to a mailbox corresponding to the switch VM, and trigger first doorbell interrupt information, where the first doorbell interrupt information is used to instruct the PCIE device to process the flow table update information.

Optionally, the receiving unit 801 is further configured to receive second doorbell interrupt information sent by the PCIE device, where the second doorbell interrupt information is used to notify the switch apparatus 800 that the flow table update information has been successfully written into the flow table of the PCIE device, and the sending unit is further configured to send, according to the local flow table of the switch apparatus, the data packet forwarded by the PCIE device and buffered by the processing unit 802.

Figure 9:
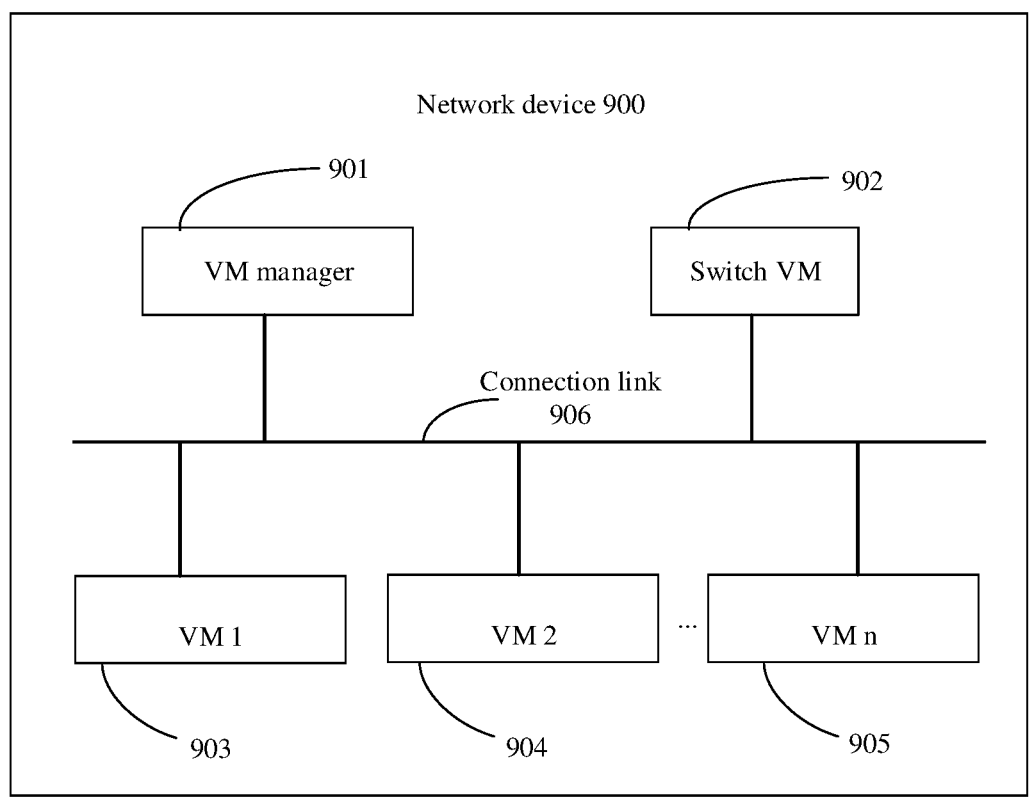
FIG. 9 is a schematic diagram of a logic structure of a network device in a network according to an embodiment of the present disclosure.

FIG. 9 is a schematic diagram of a logic structure of a network device 900 in a network according to an embodiment of the present disclosure. The network includes the network device 900 and a PCIE device. The network device 900 is connected to the PCIE device. The PCIE device is a hardware device supporting an SR-IOV standard. The PCIE device includes at least one PF and at least one VF. As shown in FIG. 9, the network device 900 includes a VM manager 901, multiple computing VMs designated as VM 1 903, VM 2 904, and VM n 905. The multiple computing VMs are at least two computing VMs. For convenience of description, FIG. 9 shows only three VMs, that is a VM 1 to a VM n. This does not constitute a limitation to this embodiment of the solution. The VM manager 901 is configured to manage the multiple computing VMs. The VM manager 901 and the multiple computing VMs (903, 904, and 905) communicate with each other using a connection link 906. A PF driver managing the PCIE device runs on the VM manager 901. A corresponding VF is configured in each computing VM 903, 904, and 905 and the switch VM 902, and a VF driver managing the corresponding VF runs on the computing VM 903, 904, and 905 and the switch VM 902. By way of example only, the network device 900 may be applied to, but is not limited to being applied to the network system 100 shown in FIG. 1 or another network system obtained by means of flexible deformation based on the system 100). It should be noted that multiple modules or units are mentioned in this embodiment of the present disclosure. A person skilled in the art should know that functions of the multiple modules or units may be distributed to more sub-modules or subunits, or may be combined into fewer modules or units, to implement the same technical effects. Therefore, these shall fall within the protection scope of the embodiments of the present disclosure.

The VM manager 901 is configured to receive a switch VM 902 creation request, create the switch VM 902 according to the switch VM 902 creation request, respond to PCI scanning of the switch VM 902, and configure, using the PF driver, the PCIE device to allocate a corresponding network resource to the switch VM 902, where a virtual switch (not shown) runs on the switch VM 902, and the virtual switch is configured to implement a network switching operation between the multiple computing VMs 903, 904, and 905.

The VM manager 901 is further configured to initialize the PCIE device using the PF driver, where a default forwarding rule of the initialized PCIE device includes setting a default forwarding port of the PCIE device to a VF 0 corresponding to the switch VM 902.

Optionally, the switch VM 902 is configured to receive, using the VF 0 corresponding to the switch VM 902, a data packet forwarded by the PCIE device, and perform, according to a preset network forwarding rule, corresponding network forwarding process on the data packet forwarded by the PCIE device.

Optionally, before receiving the switch VM 902 creation request, and creating the switch VM 902 according to the switch VM 902 creation request, the VM manager 901 is further configured to configure, using the PF driver, the PCIE device to reserve the VF 0, a corresponding PCIE address, and a corresponding communication memory resource for the switch VM 902.

Optionally, the VM manager 901 is configured to initialize a flow table of the PCIE device using the PF driver, where the flow table is used to instruct the PCIE device to perform flow table rule matching and processing on the received data packet, and when no match is found, forward the received data packet to the VF 0 corresponding to the switch VM 902.

Optionally, the switch VM 902 is configured to receive, using the VF 0 corresponding to the switch VM 902, a network data packet forwarded by the PCIE device, and perform, according to a local flow table of the switch VM 902, flow table matching and processing on the network data packet forwarded by the PCIE device.

Optionally, if the switch VM 902 successfully finds, according to the local flow table of the switch VM 902, a match for the network data packet forwarded by the PCIE device, the switch VM 902 is further configured to buffer the network data packet forwarded by the PCIE device, and send flow table update information to the PCIE device, where the flow table update information is used to update the flow table of the PCIE device, and the VM manager 901 is further configured to obtain the flow table update information, and write the flow table update information into the PCIE device using the PF driver.

Optionally, if the PF driver communicates with a VF driver using a doorbell and mailbox mechanism, the switch VM 902 is configured to send the flow table update information to a mailbox corresponding to the switch VM 902, and trigger first doorbell interrupt information, where the first doorbell interrupt information is used to instruct the PCIE device to process the flow table update information, and the VM manager 901 is configured to receive the first doorbell interrupt information forwarded by the PCIE device, read mailbox information in a mailbox corresponding to the first doorbell interrupt information, determine whether the mailbox corresponding to the first doorbell interrupt information belongs to a VF corresponding to the switch VM 902 when the mailbox information is information about configuring the flow table of the PCIE device, and store the mailbox information as the flow table update information if the mailbox corresponding to the first doorbell interrupt information belongs to the VF corresponding to the switch VM 902.

Optionally, the switch VM 902 is further configured to receive second doorbell interrupt information sent by the PCIE device, and send, according to the local flow table of the switch VM 902, the buffered network data packet forwarded by the PCIE device, where the second doorbell interrupt information is used to notify the switch VM 902 that the flow table update information has been successfully written into the flow table of the PCIE device.

Figure 10:
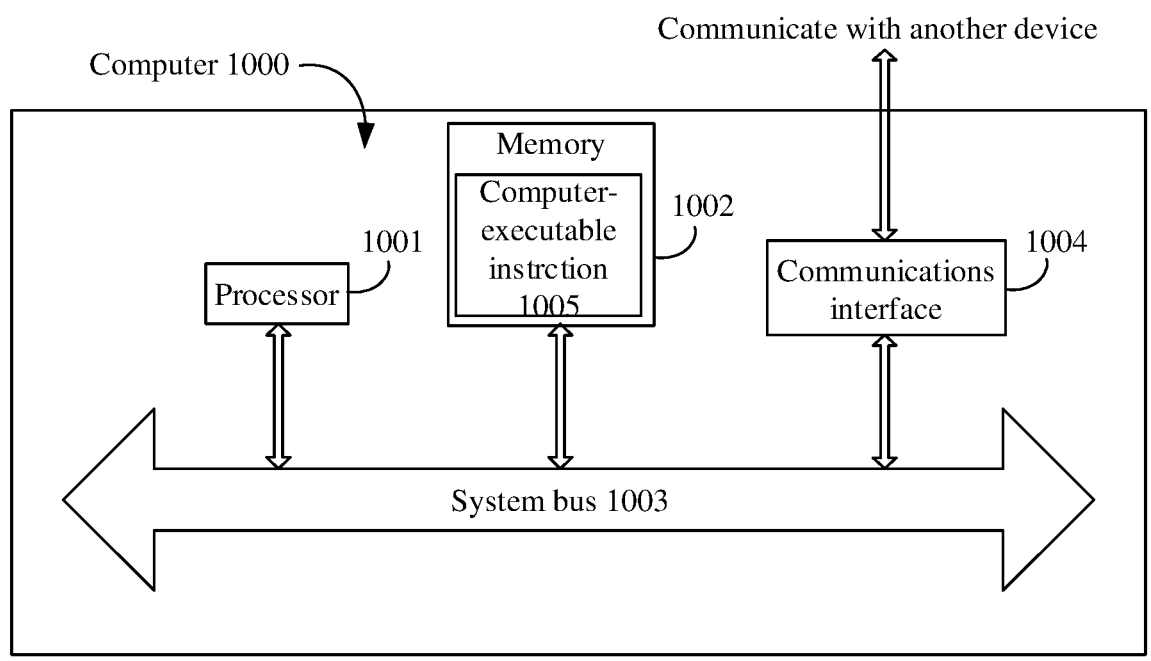
FIG. 10 is a schematic composition diagram of a logic structure of a computer according to an embodiment of the present disclosure.

As shown in FIG. 10, FIG. 10 is a schematic composition diagram of a structure of a computer 1000 according to an embodiment of the present disclosure. The computer 1000 in this embodiment of the present disclosure may include a processor 1001, a memory 1002, a system bus 1003, and a communications interface 1004, where the processor 1001, the memory 1002, and the communications interface 1004 are connected and communicate with each other using the system bus 1003.

The processor 1001 may be a single-core or multi-core central processing unit (CPU), a specific integrated circuit, or one or more integrated circuits configured to implement this embodiment of the present disclosure.

The memory 1002 may be a high speed random access memory (RAM), or a non-volatile memory, for example, at least one magnetic disk storage.

The memory is 1002 is configured to store a computer-executable instruction 1005. The computer-executable instruction 1005 may include program code.

When the computer runs, the processor 1001 runs the computer-executable instruction 1005, and may perform the procedure of the method shown in any one of FIG. 2, FIG. 3, FIG. 4, or FIG. 5A and FIG. 5B.

A person of ordinary skill in the art may understand that, each aspect of the present disclosure or a possible implementation of each aspect may be implemented as a system, a method, or a computer program product. Therefore, each aspect of the present disclosure or a possible implementation of each aspect may use forms of hardware only embodiments, software only embodiments (including firmware, resident software, and the like), or embodiments with a combination of software and hardware, which are uniformly referred to as "circuit," "module," or "system" herein. In addition, each aspect of the present disclosure or the possible implementation of each aspect may use a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a RAM, a read-only memory (ROM), an erasable programmable ROM (EPROM), flash memory, an optical fiber, and a compact disc ROM (CD-ROM).

A processor in a computer reads computer-readable program code stored in a computer-readable medium such that the processor can perform a function and an action specified in each step or a combination of steps in a flowchart, and generate an apparatus for implementing a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for configuring a network, wherein the network comprises a virtual machine (VM) manager, a plurality of computing VMs, and a Peripheral Component Interconnect Express (PCIE) device, wherein the VM manager is coupled to the PCIE device and is configured to manage the plurality of computing VMs, wherein the PCIE device supports a Single-Root Input/Output Virtualization (SR-IOV) standard and comprises at least one physical function (PF) and at least one virtual function (VF), wherein a PF driver managing the PCIE device runs on the VM manager, wherein a VF is configured in each computing VM, wherein a VF driver configured to manage the VF runs on each computing VM, and wherein the method comprises:
- receiving a switch VM creation request;
- creating a switch VM according to the switch VM creation request, wherein the switch VM is configured to run a virtual switch, and wherein the virtual switch is configured to implement network switching between the plurality of computing VMs;
- responding to Peripheral Component Interconnect (PCI) scanning of the switch VM;
- configuring, using the PF driver, the PCIE device to allocate a corresponding network resource to the switch VM; and
- initializing the PCIE device using the PF driver, wherein a default forwarding rule of the initialized PCIE device comprises setting a default forwarding port of the PCIE device to a VF receiving queue (VF 0) corresponding to the switch VM.

2. The method according to claim 1, wherein before receiving the switch VM creation request, the method further comprises configuring, using the PF driver, the PCIE device to reserve the VF 0, a corresponding PCIE address, and a corresponding communication memory resource for the switch VM.

3. The method according to claim 2, wherein configuring the PCIE device to allocate the corresponding network resource to the switch VM comprises configuring, using the PF driver, the PCIE device to allocate the reserved VF 0, corresponding PCIE address, and corresponding communication memory resource to the switch VM.

4. The method according to claim 3, wherein initializing the PCIE device using the PF driver comprises initializing a flow table of the PCIE device using the PF driver, and wherein the flow table instructs the PCIE device to perform flow table rule matching and processing on a received data packet, and forward the received data packet to the VF 0 corresponding to the switch VM when no match is found.

5. A method for configuring a network, wherein the network comprises a virtual machine (VM) manager, a plurality of computing VMs, and a Peripheral Component Interconnect Express (PCIE) device, wherein the VM manager is coupled to the PCIE device and is configured to manage the plurality of computing VMs, wherein the PCIE device supports a Single-Root Input/Output Virtualization (SR-IOV) standard and comprises at least one physical function (PF) and at least one virtual function (VF), wherein a PF driver managing the PCIE device runs on the VM manager, wherein a VF is configured in each computing VM, wherein a VF driver configured to manage the VF runs on each computing VM, and wherein the method comprises:
- receiving, by the PCIE device, configuration information of the PF driver;
- allocating, by the PCIE device, a corresponding network resource to a switch VM created by the VM manager, wherein the switch VM is configured to run a virtual switch, and wherein the virtual switch is configured to implement network switching between the plurality of computing VMs; and
- receiving an initialization operation of the PF driver, wherein a default forwarding rule of the initialized PCIE device comprises setting a default forwarding port of the PCIE device to a VF receiving queue (VF 0) corresponding to the switch VM.

6. The method according to claim 5, wherein before receiving the configuration information of the PF driver, the method further comprises:
- receiving, by the PCIE device, initialization configuration operation information of the VM manager; and
- reserving the VF 0, a corresponding PCIE address, and a corresponding communication memory resource for the switch VM according to the initialization configuration operation information.

7. The method according to claim 6, wherein allocating the corresponding network resource to the switch VM comprises allocating the reserved VF 0, corresponding PCIE address, and corresponding communication memory resource to the switch VM.

8. The method according to claim 7, wherein receiving the initialization operation of the PF driver comprises receiving a flow table from the PF driver, and wherein the flow table instructs the PCIE device to perform flow table rule matching and processing on a received data packet, and forward the received data packet to the VF 0 corresponding to the switch VM when no match is found.

9. The method according to claim 8, wherein after receiving the flow table, the method further comprises:
- receiving a network data packet;
- performing the flow table rule matching on the received network data packet according to the flow table; and
- forwarding the received network data packet to the VF 0 corresponding to the switch VM when no match is found.

10. The method according to claim 9, wherein when the switch VM successfully finds a match in a local flow table, the method further comprises:
- receiving flow table update information from the switch VM, wherein the flow table update information updates a flow table of the PCIE device;
- instructing the VM manager to process the flow table update information;
- receiving the flow table update information written by the PF driver; and
- updating the flow table of the PCIE device according to the flow table update information.

11. A virtual machine (VM) manager, wherein the VM manager is configured in a network, wherein the network further comprises a plurality of computing VMs and a Peripheral Component Interconnect Express (PCIE) device, wherein the VM manager is coupled to the PCIE device and is configured to manage the plurality of computing VMs, wherein the PCIE device supports a Single-Root Input/Output Virtualization (SR-IOV) standard and comprises at least one physical function (PF) and at least one virtual function (VF), wherein a PF driver managing the PCIE device runs on the VM manager, wherein a VF is configured in each computing VM, wherein a VF driver configured to manage the VF runs on each computing VM, and wherein the VM manager comprises:
- a processor; and
- a memory configured to store a computer-executable instruction,
- wherein the processor is coupled to the memory using a communications bus, and
- wherein when the VM manager runs the computer-executable instruction stored in the memory, the processor to is configured to:
  - receive a switch VM creation request;

create a switch VM according to the switch VM creation request, wherein the switch VM is configured to run a virtual switch, and wherein the virtual switch is configured to implement network switching between the plurality of computing VMs;

respond to Peripheral Component Interconnect (PCI) scanning of the switch VM;

configure, using the PF driver, the PCIE device to allocate a corresponding network resource to the switch VM; and initialize the PCIE device using the PF driver, wherein a default forwarding rule of the initialized PCIE device comprises setting a default forwarding port of the PCIE device to a VF receiving queue (VF 0) corresponding to the switch VM.

12. The VM manager according to claim 11, wherein the computer-executable instruction further causes the processor to be configured to configure, using the PF driver, the PCIE device to reserve the VF 0, a corresponding PCIE address, and a corresponding communication memory resource for the switch VM.

13. The VM manager according to claim 12, wherein the computer-executable instruction further causes the processor to be configured to configure, using the PF driver, the PCIE device to allocate the reserved VF 0, corresponding PCIE address, and corresponding communication memory resource to the switch VM.

14. The VM manager according to claim 13, wherein the computer-executable instruction further causes the processor to be configured to initialize a flow table of the PCIE device using the PF driver, wherein the flow table instructs the PCIE device to perform flow table rule matching and processing on a received data packet, and forward the received data packet to the VF 0 corresponding to the switch VM when no match is found.

15. A Peripheral Component Interconnect Express (PCIE) device, wherein the PCIE device is configured in a network, wherein the network further comprises a virtual machine (VM) manager, and a plurality of computing VMs, wherein the VM manager is coupled to the PCIE device and is configured to manage the plurality of computing VMs, wherein the PCIE device supports a Single-Root Input/Output Virtualization (SR-IOV) standard, wherein the PCIE device comprises at least one physical function (PF) and at least one virtual function (VF), wherein a PF driver managing the PCIE device runs on the VM manager, wherein a VF is configured in each computing VM, wherein a VF driver configured to manage the VF runs on each computing VM, and wherein the PCIE device further comprises:

a processor; and a memory configured to store a computer-executable instruction, wherein the processor is coupled to the memory using a communications bus, and wherein the computer-executable instruction stored in the memory causes the processor to be configured to:

receive, by the PCIE device, configuration information of the PF driver;

allocate a corresponding network resource to a switch VM created by the VM manager; and receive an initialization operation of the PF driver, wherein a default forwarding rule of the initialized PCIE device comprises setting a default forwarding port of the PCIE device to a VF receiving queue (VF 0) corresponding to the switch VM.

16. The PCIE device according to claim 15, wherein the computer-executable instruction further causes the processor to be configured to:

receive, by the PCIE device, initialization configuration operation information of the VM manager; and reserve the VF 0, a corresponding PCIE address, and a corresponding communication memory resource for the switch VM according to the initialization configuration operation information.

17. The PCIE device according to claim 16, wherein the computer-executable instruction further causes the processor to be configured to allocate the reserved VF 0, corresponding PCIE address, and corresponding communication memory resource to the switch VM.

18. The PCIE device according to claim 17, wherein the computer-executable instruction further causes the processor to be configured to receive a flow table from the PF driver, wherein the flow table instructs the PCIE device to perform flow table rule matching and processing on a received data packet, and forward the received data packet to the VF 0 corresponding to the switch VM when no match is found.

19. The PCIE device according to claim 18, wherein the computer-executable instruction further causes the processor to be configured to:

receive a network data packet;

perform the flow table rule matching on the received network data packet according to the flow table; and forward the received network data packet to the VF 0 corresponding to the switch VM when no match is found.

20. The PCIE device according to claim 19, wherein the computer-executable instruction further causes the processor to be configured to:

receive flow table update information from the switch VM, wherein the flow table update information updates a flow table of the PCIE device;

instruct the VM manager to process the flow table update information;

receive the flow table update information written by the PF driver; and update the flow table of the PCIE device according to the flow table update information.

* * * * *